(12) United States Patent
Hayashi et al.

(10) Patent No.: US 7,704,571 B2
(45) Date of Patent: Apr. 27, 2010

(54) LIQUID CRYSTAL COMPOSITION, COLOR FILTER AND LIQUID CRYSTAL DISPLAY APPARATUS, AND METHOD OF FORMING PHASE DIFFERENCE LAYER

(75) Inventors: Shinji Hayashi, Saitama (JP); Norihisa Moriya, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 14 days.

(21) Appl. No.: 11/990,939

(22) PCT Filed: Jun. 13, 2007

(86) PCT No.: PCT/JP2007/061901

§ 371 (c)(1),
(2), (4) Date: Feb. 25, 2008

(87) PCT Pub. No.: WO2007/145247

PCT Pub. Date: Dec. 21, 2007

(65) Prior Publication Data

US 2008/0303985 A1    Dec. 11, 2008

(30) Foreign Application Priority Data

Jun. 13, 2006    (JP) .................... 2006-163237

(51) Int. Cl.
*C09K 19/38* (2006.01)
*G02B 5/20* (2006.01)
*G02B 5/30* (2006.01)
*G02F 1/13363* (2006.01)

(52) U.S. Cl. ............. 428/1.32; 428/1.31; 252/299.01; 252/299.5; 349/106; 349/117; 349/183

(58) Field of Classification Search .......... 428/1.3, 428/1.32; 252/299.5, 299.01; 349/106, 183, 349/117

See application file for complete search history.

(56) References Cited

U.S. PATENT DOCUMENTS 7,393,569 B2 *    7/2008    Ito et al. .................... 428/1.1

2005/0179003 A1    8/2005    Heckmeier et al.
2006/0134350 A1    6/2006    Hirai et al.
2006/0222784 A1    10/2006    Saigusa et al.
2006/0278851 A1    12/2006    Ito et al.

FOREIGN PATENT DOCUMENTS

| JP | A-10-319408 | 12/1998 |
|---|---|---|
| JP | A-11-240890 | 9/1999 |
| JP | A-2003-228068 | 8/2003 |
| JP | A-2004-524385 | 8/2004 |
| JP | A-2005-024920 | 1/2005 |
| JP | A-2005-165240 | 6/2005 |
| JP | A-2006-126757 | 5/2006 |
| JP | A-2006-188662 | 7/2006 |
| JP | A-2006-291096 | 10/2006 |
| JP | A-2006-307150 | 11/2006 |
| JP | A-2007-016213 | 1/2007 |
| JP | A-2007-070302 | 3/2007 |

OTHER PUBLICATIONS

Edited by Koji Okano et al.; Liquid Crystal Applied Edition; Baifukan Co., Ltd.; Nov. 11, 1987.

* cited by examiner

*Primary Examiner*—Shean C Wu
(74) *Attorney, Agent, or Firm*—Oliff & Berridge, PLC

(57) ABSTRACT

An object of the invention is to provide a liquid crystal composition intended to be applied to the surface of a base material to form a phase difference layer, the liquid crystal composition being capable of forming a phase difference layer well indicating homeotropic orientation without the presence of an oriented film, even if the liquid crystal composition is directly applied to the base material surface, as well as a phase difference layer formed by the liquid crystal composition, a color filter and a liquid crystal display apparatus using the phase difference layer, and further a method of forming the phase difference layer. To a liquid crystal composition containing one kind or two or more kinds of crosslinking liquid crystal compounds is further added at least an amino-based silane coupling agent to prepare a liquid crystal composition. The liquid crystal composition is directly applied to the surface of a base material to orient the crosslinking liquid crystal compound on the base material surface in a direction perpendicular to the base material surface, and then the resulting material is crosslinking polymerized to form a phase difference layer.

20 Claims, 3 Drawing Sheets

Measurement direction: X and Y axis directions

LIQUID CRYSTAL COMPOSITION, COLOR FILTER AND LIQUID CRYSTAL DISPLAY APPARATUS, AND METHOD OF FORMING PHASE DIFFERENCE LAYER

TECHNICAL FIELD

The present invention relates to a liquid crystal composition, a color filter and liquid crystal display apparatus, with a phase difference layer, made of the liquid crystal composition, and a method of forming a phase difference layer.

BACKGROUND ART

Recently, liquid crystal display apparatuses have the large advantages of thin-type, small weights and low consumption of electric power, and thus are actively used for display apparatuses of personal computers, cellular phones, electronic organizers and the like. The liquid crystal display apparatuses utilize the birefringence of driving liquid crystals to perform switching of light. Thus, the liquid display apparatus has the problem of view angle dependency attributable to the birefringence of driving liquid crystals. For the resolution of the problem, a variety of phase difference layer forming films have been developed. The phase difference forming film is normally fabricated by stretching of film made of polyacrylate, polycarbonate, triacetyl cellulose and the like, and is placed outside a liquid crystal cell.

The phase difference layer forming film is normally stuck to a substrate by means of an adhesive and used. A refractive index of the adhesive applied to the substrate differs from that of a phase difference layer forming film, thereby posing a problem in that the former film causes irregular refraction on the surface of a display. In particular, when the phase difference forming film is stuck to the outside of a substrate, the exposed film absorbs humidity and expands. Furthermore, when the phase difference layer forming film is used, there is a problem of being incapable of carrying out patterning for a phase difference layer fit to the pixel size of a display, or a problem of a change of optical properties by time lapse shrinkage due to low heat resistance, or the like.

On the contrary, recently, a method is proposed in which a phase difference layer is placed inside a liquid crystal cell by use of a liquid crystal material such as a crosslinking liquid crystal or macromolecule liquid crystal. When a phase difference layer placed in the inside is formed, a method is adopted that entails forming an oriented film in advance on the surface of a base material on which the phase difference layer is to be formed by a rubbing method, light orientation method, ion beam method or the like and then applying a liquid crystal material on the base material to form a phase difference layer. In this manner, the formation of an oriented film in advance makes it possible to control the orientation of a liquid crystal material to be applied later (see Patent Literature No. 1). Additionally, in a phase difference layer produced by orienting a crosslinking liquid crystal compound perpendicular to a base material (homeotropic orientation), a variety of orientation methods are studied in order to stabilize the orientation of the crosslinking liquid crystal compound (see Patent Literature No. 2). On the other hand, for the purposes of making a display apparatus thin and reducing the number of production steps, a crosslinking liquid crystal compound composition in which homeotropic orientation is obtained without use of an oriented film is also studied (see Patent Literature No. 3).

Patent Literature No. 1: Japanese Patent Application Laid-Open No. (JP-A) 10-319408
Patent Literature No. 2: JP-A 11-240890
Patent Literature No. 3: JP-A 2004-524385

DISCLOSURE OF INVENTION

Technical Problem

However, formation of a phase difference layer within a liquid crystal cell without use of an oriented film makes it difficult to stably homeotropic-orient a crosslinking liquid crystal compound, and thus poses a problem in that a high quality display is not sufficiently obtained when the phase difference layer is used as a view angle compensation member in a liquid crystal display apparatus or the like.

In particular, when properties of the surface of a base material on which a phase difference layer is to be formed are not good, the formation of the phase difference layer by direct application of a crosslinking liquid crystal compound composition onto the base material poses a problem that a sufficient homeotropic orientation is not obtained. For example, in order to improve wettability of the base material surface by removing dirt such as dusts on the base material surface, cleaning treatment or modification treatment of the substrate surface is carried out in some cases. In this case, although the wettability of the base material surface is improved, properties of the base material surface is changed and also the formation of a phase difference layer thereon poses a problem in that the orientation of the crosslinking liquid crystal compound constituting the phase difference layer is disturbed.

The present invention has been made in consideration of the above problems and is directed to provide a method of forming a phase difference layer exhibiting stable homeotropic orientation even without use of an oriented film. Another object of the present invention is to provide a liquid crystal composition capable of forming a phase difference layer exhibiting stable homeotropic orientation even without use of an oriented film. In particular, the object is to provide a liquid crystal composition capable of forming a phase difference layer that stably homeotropically orients, even when a base material surface is not good such as in the case where properties of the base material surface are changed by cleaning treatment and/or modification treatment of the base material surface. Additionally, still another object of the present invention is to provide a phase difference color filter and a liquid crystal display apparatus formed by use of a liquid crystal composition of the present invention.

Solution to Problem

The present invention is based on a finding that, when a phase difference layer is formed on a base material through the use of a liquid crystal composition containing a crosslinking liquid crystal compound and an amino-based silane coupling agent, the phase difference layer that stably homeotropically orientates can be formed on the base material surface.

According to an aspect of the present invention, there is provided a liquid crystal composition containing one kind or two or more kinds of crosslinking liquid crystal compounds and an amino-based silane coupling agent.

In the liquid crystal composition of the invention, at least one kind of the crosslinking liquid crystal compounds may have one or two or more (meth)acryloyl groups in one molecule.

The liquid crystal composition may further contain a photopolymerization initiator.

The liquid crystal composition may contain a perpendicular orientation assistant.

The liquid crystal composition may contain 0.01 to 20% by weight (value relative to a total amount of blending components) of the amino-based silane coupling agent.

The liquid crystal composition may contain 99.89 to 70% by weight (value relative to a total amount of blending components) of a crosslinking liquid crystal compound having the (meth) acryloyl group, 0.01 to 20% by weight (value relative to a total amount of blending components) of the amino-based silane coupling agent, and 0.1 to 10% by weight (value relative to a total amount of blending components) of a photopolymerization initiator.

In the liquid crystal composition, a ketimine-based silane coupling agent may be used as the amino-based silane coupling agent.

The liquid crystal composition may be used for the formation of a phase difference layer that homeotropically orients.

Use of the liquid crystal composition of the invention can provide a color filter produced formation of at least a colored layer and phase difference layer by direct or indirect on a transparent substrate, wherein the phase difference layer is formed by mutual crosslinking polymerization, in a state which a crosslinking liquid crystal compound contained in the liquid crystal composition of the invention oriented in a direction perpendicular to the substrate surface.

In the color filter, the crosslinking polymerization may be developed by irradiating with light the surface of a coating film formed by direct application of the liquid crystal composition onto the colored layer.

In the color filter, the entire face or part of the surface of the colored layer directly or indirectly formed on the transparent substrate may be subjected to cleaning treatment and/or surface modification treatment, and the phase difference layer may be directly formed on the surface of the colored layer subjected to the cleaning treatment and/or surface modification treatment.

The color filter may be configured such that, in a test of measuring the luminance of light passing through the color filter when the color filter is sandwiched between two linear polarizing plates and placed under a polarizing microscope and then irradiated with visible light from one face of the linear polarizing plates, a value of Ton/Toff is 1000 or more, where Toff is the luminance measured in a state in which transparent axis directions of the two linear polarizing plates are mutually crossed and Ton is the luminance measured in a state in which the transparent axis directions are mutually parallel.

The color filter may be configured such that, at an arbitrary point on the surface of the phase difference layer, a phase difference value of a visible light ray transmitting in a direction perpendicular to the substrate is 4 nm or less.

In the color filter, a plurality of spacers constituted by a cured substance of an ionizing radiation-curable resin composition may be directly or indirectly formed on the phase difference layer so as to be placed at arbitrary intervals.

According to another aspect of the present invention, there is provided a liquid crystal display apparatus including: the color filter provided with at least a colored layer recited and a phase difference layer; and a liquid crystal driving substrate provided with at least liquid crystal driving electrodes on a transparent substrate, wherein the color filter and the liquid crystal driving substrate face each other with the phase difference layer and the liquid crystal driving electrodes being inside, and a driving liquid crystal material is enclosed between the color filter and the liquid crystal driving substrate.

According to still another aspect of the present invention, there is provided a method of forming a perpendicularly orienting phase difference layer by use of a crosslinking liquid crystal composition containing one kind or two or more kinds of crosslinking liquid crystal compounds, the method including: adding an amino-based silane coupling agent to the crosslinking liquid crystal composition; applying the crosslinking liquid crystal composition having the amino-based silane coupling agent added thereto directly to the top surface of a base material to form a coating film, and crosslinking polymerizing a crosslinking liquid crystal compound present in the coating film in a state of perpendicularly orienting the crosslinking liquid crystal compound to be cured the coating film.

In the method of forming a phase difference layer, the base material may be a base material produced by directly or indirectly forming a colored layer on a transparent substrate, and the crosslinking liquid crystal composition having the amino-based silane coupling agent added thereto may be directly applied to a top surface of colored layer.

In the method of forming a phase difference layer, the entire face or part of the colored layer surface may be subjected to cleaning treatment and/or surface modification treatment in advance.

In the method of forming a phase difference layer, irradiation of the coating film surface with light may crosslinking polymerize the crosslinking liquid crystal compound.

Some terms used in the present specification are defined in the following.

The term "liquid crystal composition" stands for both of a composition (mixture form composition) of a mixture that contains at least a crosslinking liquid crystal compound and an amino-based silane coupling agent and further has other substances, which are used for forming a phase difference layer, blended therein, and a composition (solution form composition) in a solution state prepared by dissolving or suspending the above mixture in a solvent. Additionally, herein, a liquid crystal composition of the present invention of being a "composition in a solution state" particularly described above is conveniently called a "liquid crystal composition solution".

The term "(meth)acryloyl group" is used as a general term of two functional groups, i.e., an "acryloyl group" and a "methacryloyl group". Additionally, an example of the acryloyl group is an acrylate group (acryloyloxy group), and an example of the methacryloyl group is a methacrylate group.

The term "value relative to a total amount of blending components" stands for a weight ratio of each blend based on 100 of the total weight of blends blended as substances constituting the mixture form composition, when a liquid crystal composition of the invention is the mixture form composition. The term stand for a weight ratio of each blend based on 100 of a weight (i.e., the total weight of blends prior to dissolving or suspending it in a solvent) obtained by subtracting the weight of the solvent from the weight of the solution, when a liquid crystal composition of the invention is a solution form composition of a solution produced by dissolving in or mixing with the solvent the blend.

The term "phase difference layer" means a layer having a phase difference control function capable of optically compensating a phase difference (retardation) change of light.

The term "homeotropic orientation" refers to an orientation state in which an optical axis of liquid crystal molecules constituting a phase difference layer is perpendicular or substantially perpendicular to the surface of a substrate. In addition, the phrase "a phase difference layer homeotropically orientates" refers to a state in which liquid crystal molecules constituting a phase difference layer orientates perpendicular to the surface of a substrate. Additionally, in the present invention, an ideal perpendicular orientation (homeotropic orientation) of liquid crystal molecules refers to a case where a refraction index nx of the x axis direction has substantially the same value as that of a refraction index ny of the y axis direction and a phase difference value in a case of a measurement angle of 0° is 4 nm or less, preferably, 3.5 nm or less, and more preferably 3 nm or less, when the thickness direction of a phase difference layer is taken as the z axis and the xyz Cartesian coordinate is considered.

Advantageous Effects of Invention

A phase difference layer forming method of the invention involves further adding an amino-based silane coupling agent to a liquid crystal composition containing a crosslinking liquid crystal compound, and then directly applying the resulting material to the top surface of a base material to form a coating film. Then, the method involves curing the crosslinking liquid crystal compound present in the coating film in a perpendicular oriented state to enable a phase difference layer that stably homeotropically orients to be provided. Thus, there is no need to form an oriented film on the top surface of a base material in advance. Moreover, according to the method of the invention, even when a phase difference layer is formed on the top surface of a base material such as a transparent substrate or a colored layer, a phase difference layer that stably homeotropically orients can be formed. In particular, even when the entire surface or a part of the colored layer surface is subjected to cleaning treatment and/or surface modification treatment in advance, use of the method of the invention prevents homeotropic orientation of a crosslinking liquid crystal compound constituting a phase difference layer from being disturbed.

A liquid crystal composition of the invention is formed by addition of a crosslinking liquid crystal compound and an amino-based silane coupling agent. This makes it possible to stably perpendicularly orient the crosslinking liquid crystal compound in the liquid crystal composition without the presence of an oriented film regardless of surface properties of the base material, when a liquid crystal composition of the invention is applied to the surface of, for example, a base material formed by a colored layer on a glass substrate to thereby form a coating film, and then a crosslinking liquid crystal compound present in the coating film is oriented and cured. In particular, even for the top surface of a base material of which surface properties are changed through cleaning treatment or surface modification treatment, the use of the liquid crystal composition of the invention enables the formation of a phase difference layer that stably homeostatically orients without disturbing the orientation of the crosslinking liquid crystal compound contained in the composition.

In addition, according to the present invention, inclusion of a ketimine-based silane coupling agent in a liquid crystal composition has the effect that a phase difference extremely excellent in transparency can be provided.

A color filter provided with a phase difference layer constituted by containing the above ketimine-based silane coupling agent is very high in transparency of a phase difference layer as described above, thereby achieving high contrast and being capable of providing a higher quality image.

The phase difference layer excellent in the orientation stability exhibits an excellent phase difference function and contributes to a view angle modification effect greatly. In other words, a color filter provided with the phase difference layer of the invention has no light leakage when the color filter is sandwiched between polarizing plates placed in a crossed Nicols state and observed under a polarization microscope. For this reason, the use of the color filter in a liquid crystal display apparatus can provide a high quality display. In particular, when a luminance ratio of the display of a liquid crystal cell using the color filter of the invention is measured and the luminance ratio is 1000 or more, the above liquid crystal cell can provide a very excellent display.

In particular, a color filter exhibiting a phase difference value of 4 nm or less of the invention preferably provides a particularly good homeotropic orientation.

Moreover, a liquid crystal display apparatus using a color filter having the above effect stably has an excellent view angle modification effect.

Additionally, a phase difference layer formed by use of the liquid crystal composition of the invention also has an effect excellent in adhesion with a base material. Because of this, a color filter having a phase difference layer formed by the liquid crystal composition of the invention, when used in a liquid crystal display apparatus, hardly deteriorates in time lapse and imparts an excellent view angle to the liquid crystal display apparatus over a long period of time.

REFERENCE SIGNS LIST

Figure 1:
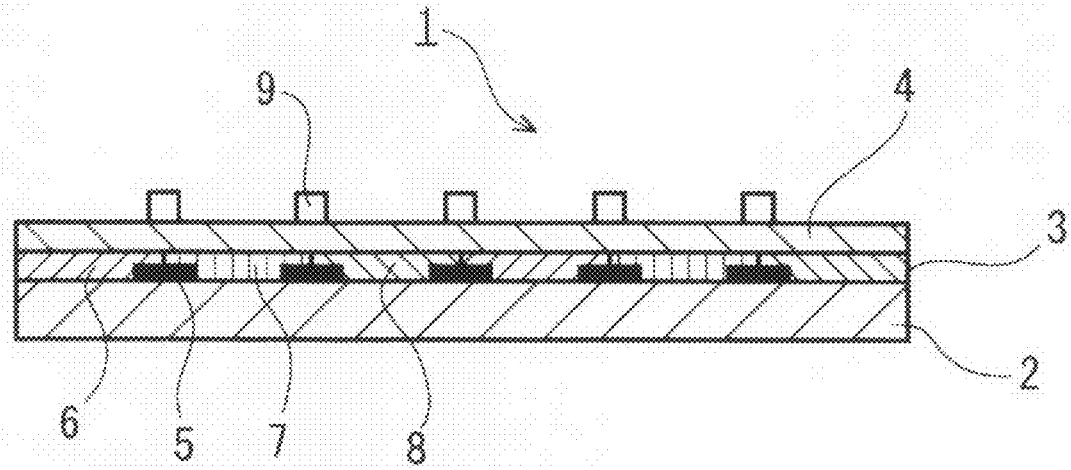
FIG. 1 is a longitudinal cross sectional view schematically showing one embodiment of a color filter of the invention.

1 Color Filter
2 Transparent Substrate
3 Colored Layer
4 Phase Difference Layer
5 Spacer

BEST MODE FOR CARRYING OUT INVENTION

<Crosslinking Liquid Crystal Compounds>

A crosslinking nematic liquid crystal can be used as the crosslinking liquid crystal compound used in a crosslinking liquid crystal composition (hereinafter, may be simply referred to as "liquid crystal composition") of the invention. Examples of the crosslinking nematic liquid crystals include a monomer, oligomer, and polymer having, in one molecule, at least one polymerizing group such as a (meth)acryloyl group, epoxy group, oxetane group and isocyanate group. The crosslinking liquid crystal compounds that can be used include one compound or two or more mixtures of the compounds expressed by general formula (1) indicated in chemical formula 1 below or expressed by general formula (2) indicated in chemical formula 2 below, one compound or two or more mixtures of the compounds indicated in chemical formula 3 or 4, or mixtures of combinations thereof. In particular, at least one kind of crosslinking nematic liquid crystal compounds constituting a crosslinking liquid crystal compound in the invention preferably has one or two or more (meth)acryloyl groups in one molecule.

As described above, in the invention, an amino-based silane coupling agent is further added to a liquid crystal composition containing a crosslinking liquid crystal compound. As a result, when a phase difference layer is formed on the surface of a base material by use of the liquid crystal composition of the invention, a crosslinking liquid crystal compound constituting the phase difference layer can be well oriented in a direction perpendicular to the surface of a substrate. A mechanism achieving the above good perpendicular orientation is not clarified by the invention. However, the following is taken into consideration about the above mechanism. In other words, when a coating film is formed by direct application of the liquid crystal composition of the invention to the surface of a base material, the above amino-based silane coupling agents are present in the coating film in a dispersed state. The presence of the silane coupling agent causes a crosslinking liquid crystal compound constituting the coating film to be well perpendicularly oriented. More specifically, the silane coupling agent exerts a good action not only on the orientation of acrosslinking liquid crystal compound present in an interfacial region between the coating film and the base material or in an interfacial region between the coating film and an air layer, but also on the orientation of a crosslinking liquid crystal compound present in an intermediate region of the coating film. Therefore, even when the orientation of a crosslinking liquid crystal compound present in the base material interface is unstable due to the change in properties of the base material surface or the presence of irregularities, the presence of the silane coupling agent causes a crosslinking liquid crystal compound present in the intermediate region of the coating film to indicate a good homeotropic orientation. Under the control of a good homeotropic orientation of crosslinking liquid crystal compounds present in the intermediate region, crosslinking liquid crystal compounds present in the interfacial region between the coating film and the base material or in the interfacial region between the coating film and the air layer are also considered to well homeotropically orient.

[Chemical formula 1]

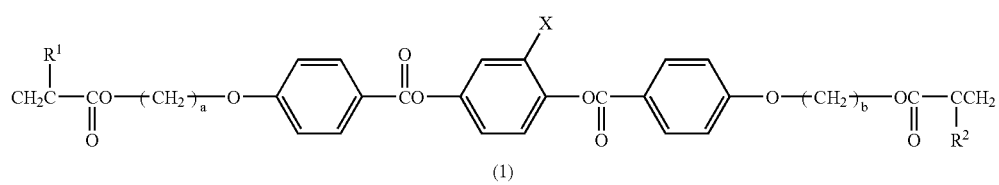

(1)

[Chemical formula 2]

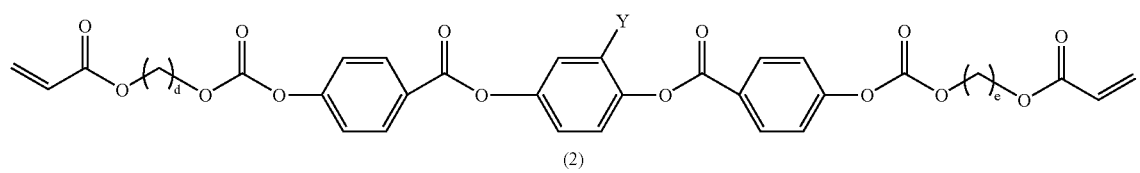

(2)

[Chemical formula 3]

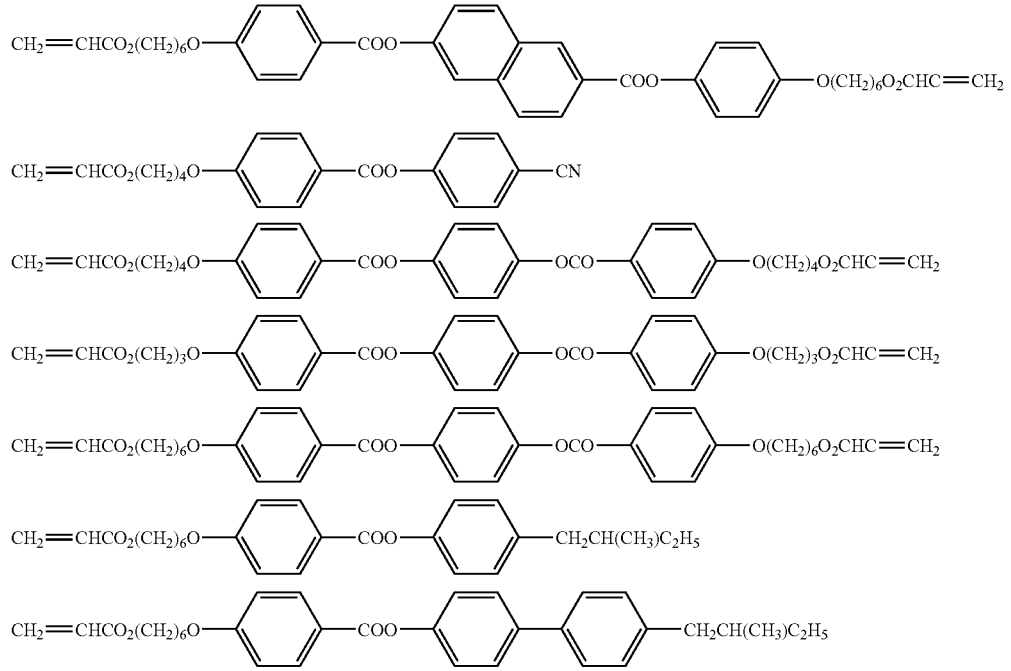

-continued

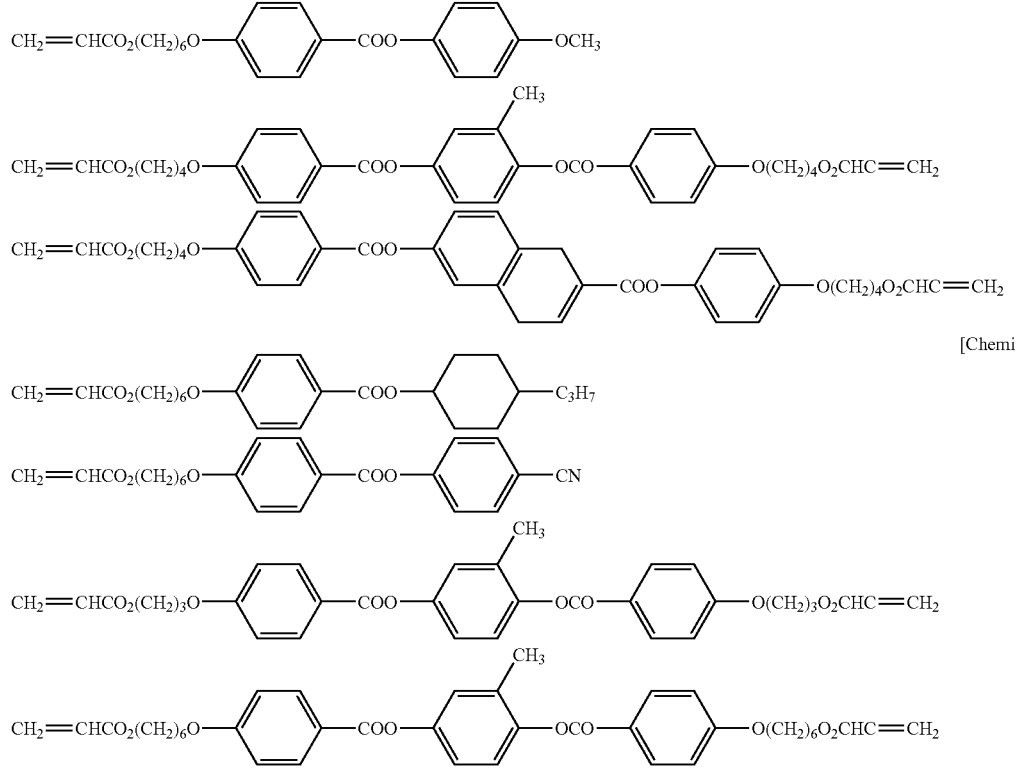

[Chemical formula 4]

In general formula (1) indicated in chemical formula 1, $R^1$ and $R^2$ indicate respectively hydrogen and a methyl group. For further widening of the temperature range in which the crosslinking liquid crystal compound shows a liquid crystal phase, at least either $R^1$ or $R^2$ is preferably hydrogen, and the both are more preferably hydrogen atoms. Additionally, X in general formula (1) and Y in general formula (2) may be any of hydrogen, chlorine, bromine, iodine, an alkyl group having 1 to 4 carbon atoms, a methoxy group, a cyano group or a nitro group. In particular, X and Y above are preferably chlorine or a methyl group. The crosslinking liquid crystal compounds expressed by general formulae (1) and (2) have an alkylene group between a (meth)acryloyloxy group at both ends of a molecular chain and an aromatic ring positioned in an intermediate of the molecular chain. "a" and b and d and e indicating the chain length of the alkylene group can be each individually arbitrarily determined as integers in the range of from 2 to 12, and are preferably in the range of from 4 to 10, more preferably in the range of from 6 to 9. The compound of general formula (1) with a=b=0 or the compound of general formula (2) with d=e=0 is unstable and likely to be hydrolyzed, and further crystallinity of the compound itself tends to be high. In addition, the compound of general formula (1) or the compound of general formula (2) with a and b or d (=e) each being 13 or more tends to be low in isotropic phase transition temperature (TI). For this reason, when the compound of general formula (1) or general formula (2) has a and b or d (=e) that are/is each 13 or more, the temperature range stably indicating liquid crystallinity (temperature range maintaining a liquid crystal phase) becomes narrow, so that use of the compound for a liquid crystal composition of the invention is not preferable.

In chemical formulae 1 to 4 as depicted above, monomers of crosslinking liquid crystal compounds are illustrated. However, oligomers of crosslinking liquid crystal compounds, polymers of crosslinking liquid crystal compounds, and the like can also be selected, as appropriate, from substances conventionally used, and used as crosslinking materials of the invention. In general, the amount of retardation of a phase difference layer and orientation characteristics are determined by a birefringence Δn of a liquid crystal molecule and a film thickness of a phase difference layer. For this reason, the Δn of the crosslinking liquid crystal compound is preferably in the order of 0.03 to 0.2, more preferably in the order of 0.05 to 0.15.

The crosslinking liquid crystal compound is preferably contained in a liquid crystal composition of the invention so as to be 70% by weight (value relative to a total amount of blending components) or more, preferably 75% by weight (value relative to a total amount of blending components) or more. Making the amount of addition 70% by weight (value relative to a total amount of blending components) or more can improve liquid crystallinity and reduce the generation of orientation failure of the crosslinking liquid crystal compound in a phase difference layer to be able to neglect. The addition of a crosslinking liquid crystal compound of 70% by weight (value relative to a total amount of blending components) or more does not particularly pose a problem from the viewpoint of orientation properties of a liquid crystal compound. Hence, the balance of the amount of blending of a crosslinking liquid crystal composition relative to the amounts of blending of other additives is adjusted to determine as appropriate the amount of addition of a crosslinking liquid crystal compound within the range of 70% by weight (value relative to a total amount of blending components) or more.

However, in the case where a specific action needs to be exerted on a crosslinking liquid crystal compound or further addition of an additive is needed for imparting a specific function to a phase difference layer formed by use of the liquid crystal composition of the invention, the amount of addition of a crosslinking liquid crystal compound is not limited to the range mentioned above. In such a case, in consideration of the amounts of addition of other additives, the amount of addition of a crosslinking liquid crystal compound may be determined as appropriate.

<Silane Coupling Agents>

As a silane coupling agent blended in the liquid crystal composition of the invention, a silane coupling agent having an amino group as a functional group in its molecular structure, i.e., an amino-based silane coupling agent is used. The amino-based silane coupling agents used in the invention also include "compounds having a structure in which an amino group is reversibly masked within the molecule" in addition to, what is called, compounds classified as primary amines, secondary amines and tertiary amines. Herein, the "compounds having a structure in which an amino group is reversibly masked within the molecule" may specifically include a ketimine-based silane coupling agent. In addition, the structures in which an amino group is reversibly masked within the molecule may specifically include a ketimine structure. The above ketimine structure is a structure formed by reaction of a ketone group in a compound having the ketone group with an amino group in a compound having a primary amino group.

Examples of the amino-based silane coupling agent include amino-based silane coupling agents such as N-2(aminoethyl)3-aminopropylmethyldimethoxysilane (KBM-602 available from Shin-Etsu Chemical Co., Ltd., and TSL8345 available from Momentive Performance Materials Inc.), N-2 (aminoethyl)3-aminopropyltrimethoxysilane (KBM-603 available from Shin-Etsu Chemical Co., Ltd., and TSL8340 available from Momentive Performance Materials Inc.), 3-aminopropyltriethoxysilane (KBE-603 available from Shin-Etsu Chemical Co., Ltd., and TSL8331 available from Momentive Performance Materials Inc.), 3-aminopropyltrimethoxysilane (KBM-903 available from Shin-Etsu Chemical Co.), 3-aminopropyltriethoxysilane (KBE-903 available from Shin-Etsu Chemical Co., Ltd.), 3-triethoxysilyl-N-(1,3-dimethyl-butylidene)propylamine (KBE-9103 available from Shin-Etsu Chemical Co., Ltd.) and N-phenyl-3-aminopropyltrimethoxysilane (KBM-573 available from Shin-Etsu Chemical Co., Ltd.). From the viewpoint of enabling formation of a phase difference layer extremely excellent in transparency, when a phase difference layer is formed by use of the liquid crystal composition of the invention, of amino-based silane coupling agents, a ketimine-based silane coupling agent is more suitable for use. In the invention, silane coupling agents can also be used in combination of two or more coupling agents.

Specific examples of the ketimine-based silane coupling agent include, not only 3-triethoxysilyl-N-(1,3-dimethyl-butylidene)propylamine (KBE-9103 available from Shin-Etsu Chemical Co., Ltd.), but also 3-trimethoxysilyl-N-(diethyl-methylidene)propylamine, 3-trimethoxysilyl-N-(1-ethyl-propylidene)propylamine, 3-trimethoxysilyl-N-(1-ethyl-pentylidene)propylamine, 3-trimethoxysilyl-N-(1-methyl-butylidene)propylamine, 3-trimethoxysilyl-N-(1,3-dimethyl-butylidene)propylamine, 3-trimethoxysilyl-N-(2, 2'-dimethyl-pentylidene)propylamine, 3-trimethoxysilyl-N-(1,2-methyl-propylidene)propylamine, 3-trimethoxysilyl-N-(dipropyl-methylidene)propylamine, 3-trimethoxysilyl-N-(cyclopentylidene)propylamine, 3-trimethoxysilyl-N-(cyclohexylidene)propylamine, 3-trimethoxysilyl-N-(2-methylcyclohexylidene)propylamine, 3-trimethoxysilyl-N-(4-methylcyclohexylidene)propylamine, 3-trimethoxysilyl-N-(benzylidene)propylamine, 3-trimethoxysilyl-N-(hexylidene)propylamine, 3-trimethoxysilyl-N-(heptylidene)propylamine, 6-trimethoxysilyl-N-(1,3-dimethyl-butylidene)hexylamine, 10-trimethoxysilyl-N-(1,3-methyl-butylidene)decylamine, 10-trimethoxysilyl-N-(1,3-dimethyl-butylidene)decylamine, trimethoxysilyl-N-(1,3-methyl-butylidene)methylamine, (trimethoxysilyl)ethyl-N-(1,3-methyl-butylidene)benzylamine, 3-triethoxysilyl-N-(1-methyl-propylidene)propylamine, 3-triethoxysilyl-N-(1-methyl-butylidene)propylamine, 3-triethoxysilyl-N-(1,3-dimethyl-butylidene)propylamine, 3-triethoxysilyl-N-(1-dimethyl-pentylidene)propylamine and 3-methyldimethoxysilyl-N-(1,3-dimethyl-butylidene)propylamine.

The silane coupling agent is added to a liquid crystal composition in such a manner that the content of the silane coupling agent in the liquid crystal composition of the invention is from 0.01 to 20% by weight (value relative to a total amount of blending components), preferably from 0.01 to 5% by weight (value relative to a total amount of blending components), more preferably from 0.01 to 2% by weight (value relative to a total amount of blending components), and particularly preferably from 0.1 to 2% by weight (value relative to a total amount of blending components). In the description of the specification below, the term "% by weight" means the value relative to a total amount of blending components in the liquid crystal composition of the invention, unless otherwise specified. The silane coupling agent of 0.01% by weight or more may be added to a liquid crystal composition to thereby impart sufficient homeotropic orientation stability to a phase difference layer formed by use of the liquid crystal composition. On the other hand, regulating the amount of addition of the silane coupling agent to the liquid crystal composition is 20% by weight or less, the orientation failure of a crosslinking liquid crystal compound due to an excess amount of addition of the silane coupling agent in a phase difference layer formed by use of the liquid crystal composition is not generated, and the decrease in electricity reliability of the phase difference layer can be minimized to a negligible level.

The ratio of blending of a crosslinking liquid crystal compound to a silane coupling agent used in the liquid crystal composition of the invention is preferably 100:5.5, more preferably 100:1.1, and particularly preferably 100:0.5.

<Photopolymerization Initiators>

When a crosslinking liquid crystal compound used in the invention is photopolymerizable, a photopolymerization initiator can be further blended to the liquid crystal composition of the invention. The photopolymerization initiator serves as an initiator for polymerization of the crosslinking liquid crystal compound when the liquid crystal composition of the invention is directly applied onto a base material to form a coating film and then the crosslinking liquid crystal compound contained in the coating film is crosslinking polymerized by irradiation of the coating film with light to form a phase difference layer. A radical polymerization initiator can be used as the polymerization initiator. The radical polymerization initiator is a compound that generates a free radical by ultraviolet-ray energy. Examples of the radical polymerization initiator include benzophenone derivatives such as benzoin and benzophenone and derivatives such as their esters; xanthone and thioxanthone derivatives; halogen-bearing compounds such as chlorosulfonyl, chloromethyl polynuclear aromatic compounds, chloromethyl heterocyclic compounds and chloromethylbenzophenones; triazines; fluorenones; haloalkanes; redox couples of a photoreducing dye and a reducing agent; organic sulfur compounds; and peroxides. More specifically, preferable examples of the polymerization initiator include ketones-based and biimidazole-based compounds such as Irgacure 184, Irgacure 369, Irgacure 651 and Irgacure 907 (available from Ciba Specialty Chemicals Co., Ltd.), Darocure (available from Melc Corp.), Adeka 1717 (available from Adeka Corp.) and 2,2'-bis(o-chlorophenyl)-4,5,4'-tetraphenyl-1,2'-biimidazole (available from Kurokane Kasei Co., Ltd.). These photopolymerization initiators can be used in combination of one or two or more products. When two or more products are used in combination, initiators different in absorption wavelength are preferably used in combination so as not to inhibit mutual absorption spectral characteristics.

A liquid crystal composition of the present invention, having the photopolymerization initiator blended therein, is directly applied onto a base material to form a coating film and crosslinking liquid crystal compounds present in the coating film are oriented. Then, the coating film is irradiated with light having a photosensitive wavelength of the polymerization initiator to allow the oriented crosslinking liquid crystal compounds to be well crosslinked with each other.

The photopolymerization initiator needs to be added within the range of not largely spoiling the orientation of a crosslinking liquid crystal compound constituting a phase difference layer. Specifically, the photopolymerization initiator in a liquid crystal composition is added so as to be from 0.01 to 15% by weight (value relative to a total amount of blending components), preferably from 0.1 to 12% by weight (value relative to a total amount of blending components), more preferably from 0.1 to 10% by weight (value relative to a total amount of blending components), and particularly preferably from 0.5 to 10% by weight (value relative to a total amount of blending components). When two or more kinds of photopolymerization initiator are used in combination, the weight ratios of the total amount of photopolymerization initiator to be used are controlled so as to be within the above numerical values.

In addition to a photopolymerization initiator, to the liquid crystal composition of the invention may be added a polymerization inhibitor that controllably restrains the polymerization rate in the range of damaging the purpose, and a sensitizer for helping the absorption of electromagnetic waves such as ultraviolet rays can also be added thereto. Available examples of the polymerization inhibitor include p-benzoquinone, hydroquinone, p-t-butylcatechol, di-t-butyl-paracresol, 2,4,6-tri-t-butylphenol, hydroquinone methyl ether, α-naphthol, and acetoanidine acetate.

The contents of the crosslinking liquid crystal compound, amino-based silane coupling agent and photopolymerization initiator in the invention can be controlled as appropriate depending on the combination or the kinds of other compounds to be used, within the numerical range indicating preferred content as described above. Assume that, for example, a liquid crystal composition of the invention contains a crosslinking liquid crystal compound having a (meth) acryloyl group, an amino-based silane coupling agent and a photopolymerization initiator. In this case, the amounts contained in the liquid crystal composition are preferably 99.89 to 70% by weight (value relative to a total amount of blending components) of the crosslinking liquid crystal compound having a (meth)acryloyl group, 0.01 to 20% by weight (value relative to a total amount of blending components) of the amino-based silane coupling agent and 0.1 to 10% by weight (value relative to a total amount of blending components) of the photopolymerization initiator.

<Solvents>

The liquid crystal composition of the invention can be used for forming a phase difference layer by direct application of the composition onto a base material to orient and crosslinking polymerize it. For improvement of applicability of the composition onto a base material, the liquid crystal composition of the invention is preferably used particularly as a liquid crystal composition solution obtained by dissolving a crosslinking liquid crystal compound, an amino-based silane coupling agent and the like in a solvent.

The solvent is not particularly limited so long as it can dissolve solid components such as the crosslinking liquid crystal compound and silane coupling agent as described above and does not inhibit the performance of a material to be coated. Specific examples of the solvent include hydrocarbons such as benzene, toluene, xylene, n-butylbenzene, diethylbenzene and tetralin; ethers such as methoxybenzene, 1,2-dimethoxybenzene and diethylene glycol dimethyl ether; ketones such as acetone, methylethylketone, methylisobutylketone, cyclohexanone and 2,4-pentanedione; esters such as ethyl acetate, ethylene glycol monomethyl ether acetate, propylene glycohol monomethyl ether acetate, propylene glycol monoethyl ether acetate and γ-butyrolactone; amide solvents such as 2-pyrolidone, N-methyl-2-pyrolidone, dimethylformamide and dimethylacetamide; halogen solvents such as chloroform, dichloromethane, carbon tetrachloride, dichloroethane, tetrachloroethane, trichloroethylene, tetrachloroethylene, chlorobenzene and orthodichlorobenzene; alcohols such as t-butyl alcohol, diacetone alcohol, glycerin, monoacetin, ethylene glycol, triethylene glycol, hexylene glycol, ethylene glycol monomethyl ether, ethylcellosolve and butylcellosolve; and phenols such as phenol and parachlorophenol. The solvents can be used alone or in a mixture of two species or more. In the case where use of a single solvent only is insufficient in dissolution of solid components such as a crosslinking liquid crystal compound or may erode a material of the surface of a base material onto which a liquid crystal composition solution is to be applied, or the like, the use of a mixture of two or more solvents can avoid the disadvantages. In the solvents illustrated above, the solvents that are suitably used alone include hydrocarbon solvents and glycol monoether acetate solvents. Similarly, the solvents that are suitably used in a mixture of two kinds or more include combinations of ethers or ketones and glycols. The concentration of a liquid crystal composition solution of the invention varies depending on solubility of solid components contained in the composition or a desired thickness of a phase difference layer formed by use of the liquid crystal composition solution, and is usually from 1 to 60% by weight, particularly preferably from 3 to 40% by weight. The above concentration can be obtained by dividing the weight obtained by subtracting the weight of a solvent from the weight of a liquid crystal composition solution by the total weight of the liquid crystal composition solution and then multiplying by 100.

<Perpendicular Orientation Assistants>

The liquid crystal composition of the invention is used for forming a phase difference layer that is homeotropically oriented to the top surface of a base material. In other words, the formation of a phase difference layer entails directly applying the liquid crystal composition to the top surface of a base material, and homeotropically orienting a crosslinking liquid crystal compound contained in the liquid crystal composition, followed by crosslinking polymerizing and solidifying in the state. In a phase difference layer formed in this manner, a optical axis of liquid crystal molecules is directed toward a normal direction relative to the phase difference layer face, and a light refraction index abnormally larger than the normal light refraction index is exhibited in a normal direction of the phase difference layer. Such a phase difference layer is generally called a positive C plate. In particular, one of the excellent effects of the invention is that a phase difference layer in which crosslinking liquid crystal compounds stably homeotropically orient can be formed without disposing a perpendicular oriented film on the top surface of a base material. For further advantageous obtainment of the above effect, a perpendicular orientation assistant for helping the homeotropic orientation may be added to the liquid crystal composition.

In a liquid crystal composition, the perpendicular orientation assistant is considered to well homeotropically orient a crosslinking liquid crystal compound in the liquid crystal composition by the synergistic effect of the assistant's presence with an amino-based silane coupling agent. A special mechanism of the above synergistic effect is still not clear. However, the present inventors estimate that in a phase difference layer formed by the liquid crystal composition, at least a part of amino-based silane coupling agent couples with the perpendicular orientation assistant, so that the control force that homeotropically orients the crosslinking liquid crystal compounds is driven in the whole region of the interface region between the phase difference layer and the base material, the interface region between the phase difference layer and air, and its intermediate region.

Examples of the perpendicular orientation assistant include surface coupling agents having an alkyl chain or fluorocarbon chain perpendicularly arranged such as lecithin and quaternary ammonium surfactants, HTAB (hexadecyltrimethylammonium bromide), DMOAP (N,N-dimethyl-N-octadecyl-3-aminopropyltrimethoxysilyl chloride), N-perfluorooctylsulfonyl-3-aminopropyltrimethylammonium iodide, long-chain alkyl alcohols, and silane polymers.

<Color Filters of the Present Invention>

The liquid crystal composition of the invention can provide a phase difference layer formed by stably homeotropically orienting a crosslinking liquid crystal compound and crosslinking polymerizing it in the state, as described above. Thus, a color filter of the invention provided with the phase difference layer exhibits an excellent phase difference function by its orientation stability. In addition, a liquid crystal display apparatus provided with the color filter of the invention exerts an excellent view angle modification effect. Hereinafter, the color filter of the invention provided with the phase difference layer will be illustratively set forth with reference to the drawings.

FIG. 1 shows a color filter 1 indicating one embodiment of the present invention. The color filter 1 is formed as follows. A colored layer 3 is arranged on a transparent substrate 2, a liquid crystal composition solution of the invention is applied onto the colored layer 3, a crosslinking liquid crystal compound contained in the liquid crystal composition solution is oriented and cured to form a phase difference layer 4. Subsequently, a plurality of spacers 9 constituted by a cured material of an ionizing radiation-curable resin composition is arranged onto the top surface of the phase difference layer 4 at arbitrary intervals. The color filter 1 indicated in FIG. 1 does not have formed thereon a protective layer. However, in the invention, a protective layer may be formed in an arbitrary position such as between the colored layer 3 and the phase difference layer 4, or on the top surface of the phase difference layer 4. Moreover, taking into consideration the kind of a liquid crystal material for driving used in a liquid crystal display apparatus, a functional layer used in a display side substrate of a generally known liquid crystal display apparatus may be formed, as appropriate, within a color filter of the invention.

<Transparent Substrate>

The transparent substrate 2 in the invention that is preferably used exhibits light transparency and is optically isotropic. However, a substrate that is optically anisotropic or has a light shielding region locally can also be used as the transparent substrate 2 as necessary. Additionally, the light transmittance of the transparent substrate 2 can be selected as appropriate depending on applications of the color filter. Specifically, examples of the transparent substrate 2 include a plate, sheet or film formed by an inorganic material or organic material. Examples of the inorganic material include glass, silicon, and quartz. When a color filter of the present invention is used for a liquid crystal display apparatus, an alkali-free glass substrate containing no alkali component in the glass is preferably used as a substrate. In addition, from the viewpoints of small thermal expansibility, good dimension stability and excellent workability in high-temperature heat treatment, quartz is preferred as an inorganic material constituting the transparent substrate 2. On the other hand, examples of the organic substrate include substrates made of acryl such as polymethylmethacrylate, polyamide, polyacetal, polybutylene terephthalate, polyethylene terephthalate, polyethylene naphthalate, triacetyl cellulose, syndiotactic polystyrene or the like, polyphenylene sulfide, polyether ketone, polyether ether ketone, fluorine resin, polyether nitrile or the like, polycarbonate, modified polyphenylene ether, polycyclohexene, polynorbornane-based resin or the like, polysulfone, polyether sulfone, polypropylene, polyacrylate, polyamide imide, polyether imide, polyether ketone, or thermoplastic polyimide. However, although not illustrated or listed above, a substrate made of more general plastics is also usable as the above organic substrate. The thickness of the transparent substrate 2 is determined as appropriate depending on applications of the color filter, and a substrate having a thickness of about 5 μm to 3 mm is generally used.

<Colored Layer>

The formation of the colored layer 3 is formed by making a black matrix 5 that shields visible light of a predetermined wavelength region on the transparent substrate 2, and then making a red subpixel 6, green subpixel 7 and blue subpixel 8 in order listed, the subpixels being coloring pixels that shield visible light of a predetermined wavelength region.

The black matrix 5 has, for example, a function of preventing the overlap of the red subpixel 6, green subpixel 7 and blue subpixel 8, that are coloring pixels (hereinafter, also simply referred to as the "coloring pixels 6, 7 and 8"), to each other, and filling the intervals of coloring pixels and restraining light leakage from the space of adjacent coloring pixels. Therefore, the black matrix 5 is formed so as to compartmentalize from a planar view for every coloring pixel the region corresponding to the positions on the transparent substrate 2 on which the coloring pixels 6, 7 and 8 are to be placed. The coloring pixels 6, 7 and 8 are each arranged so as to cover the region compartmentalized by the black matrix 5 from a planar view.

The black matrix 5 is formed, for example, by patterning a metallic thin film having light shielding or light absorption such as a metallic chromium thin film or tungsten thin film in a predetermined shape on the surface of the transparent substrate 2. Additionally, as another means, the black matrix 5 is also formed by printing an organic material such as a black resin in a predetermined shape by means of an ink jet method or the like.

The coloring pixels 6, 7 and 8 formed subsequent to the above black matrix 5 are formed by disposing in a predetermined pattern a coloring pixel that passes light having a wavelength band of each color for each of red, green and blue. The arrangement form of the red subpixel 6, blue subpixel 7 and blue subpixel 8 constituting the coloring pixel can select a variety of configuration patterns such as a stripe type, mosaic type and triangle type. More specific forming methods include a method of patterning in a predetermined shape a coating film of a coloring material dispersion solution produced by dispersing a coloring material in a solvent for every color of the coloring pixels 6, 7 and 8, for example, by means of photolithography. Additionally, the other methods include a method of applying a coloring material dispersion solution in a predetermined shape by means of an ink jet method for each of the coloring pixels 6, 7 and 8. In addition, in place of the red subpixel 6, green subpixel 7 and blue subpixel 8, a coloring pixel that transmits light having a wavelength band of complementary color of each color can be used.

Moreover, the coloring layer 3 in the invention is not limited to the case where three coloring subpixels illustrated above are provided. For example, the coloring layer 3 may be constituted from coloring pixels of four colors or more, or may be constituted from a single coloring or two coloring subpixels. In the coloring layer 3, the block matrix 5 can be omitted.

<UV Cleaning Treatment>

After the formation of the colored layer 3 and prior to formation of the phase difference layer 4, the surface of the colored layer 3 is generally subjected to UV cleaning treatment or to surface modification treatment such as corona treatment. The implementation of the above treatment can desirably improve the wettability of the surface to the liquid crystal composition (particularly, a crosslinking liquid crystal compound contained therein), in a post-process, when a liquid crystal composition is applied onto the surface of the colored layer 3.

When the ultraviolet-ray cleaning treatment is carried out, the ultraviolet irradiation dose is in the range of from 500 $mJ/cm^2$ to 3000 $mJ/cm^2$, more preferably from 900 $mJ/cm^2$ to 3000 $mJ/cm^2$. An irradiation dose of 500 $mJ/cm^2$ or less cannot impart sufficient wettability to the base material surface, and an irradiation dose of 3000 $mJ/cm^2$ or more generates a disadvantage of allochroism a color filter obtained, in some cases. In particular, cleaning treatment with an ultraviolet-ray irradiation dose of from 900 $mJ/cm^2$ to 3000 $mJ/cm^2$ both inclusive preferably improves the wettability of the surface of a colored layer of being a base material. However, properties of the surface of the colored layer are largely changed by influence of ultraviolet-ray irradiation. As a result, conventionally, when a liquid crystal composition is directly applied to the surface of a colored layer cleaned with an ultraviolet-ray irradiation dose of 900 $mJ/cm^2$ or more without disposing an oriented film and then a crosslinking liquid crystal compound contained in the coating film is made to homeotropically orient, the orientation of the crosslinking liquid crystal compound is disturbed and a phase difference layer that stably homeotropically orients cannot be obtained. On the contrary, the liquid crystal composition of the invention can well homeotropically orient a crosslinking liquid crystal compound in a liquid crystal composition, even if the composition is directly applied to the surface of a colored layer cleaned with an ultraviolet-ray irradiation dose of 900 $mJ/cm^2$ or more, without the presence of an oriented film.

<Phase Difference Layer>

Next, the phase difference layer 4 will be explained. The phase difference layer 4 in the color filter 1 of the invention can be formed by directly applying a liquid crystal composition of the invention to the surface of the colored layer 3 so as to cover the colored layer 3, and homeotropically orienting a crosslinking liquid crystal compound in the liquid crystal composition, followed by crosslinking polymerization. At this time, a liquid crystal composition of a solution state, i.e., a liquid crystal composition solution is desirably used in such a manner that the liquid crystal composition is readily applied to the surface of the colored layer 3.

Examples of the method of applying a liquid crystal composition solution onto the surface of the colored layer 3 that can be used as appropriate include a variety of printing methods such as a gravure printing method, an off-set printing method, a relief printing method, a screen printing method, a transfer printing method, an electrostatic printing method and an on-demand printing method; coating printing methods such as a gravure coat method, a roll coat method, a knife coat method, an air knife coat method, a bar coat method, a dip coat method, a kiss coat method, a spray coat method, a die coat method, a comma coat method and an ink jet method; and combination thereof.

Then, dried is a coated substrate (hereinafter, it is simply called a "coated substrate." Additionally, a layer formed on the surface of the substrate applied is also called a "coating film") having applied thereon the liquid crystal composition solution. As the above drying means, natural drying may be carried out at atmospheric pressure. A method is desirable that involves reducing a pressure to about $1.5 \times 10^{-1}$ Torr or less within a closed vessel to perform reduced-pressure drying treatment and vaporize the solvent in the liquid crystal composition solution.

In the reduced-pressure drying procedure, the crosslinking liquid crystal compound contained in the liquid crystal composition at the same time with drying can be oriented in a normal direction (i.e., perpendicular direction) relative to the substrate surface. In the above reduced-pressure drying procedure, making the coated substrate a reduced pressure state can allow the coating film to be in a supercooling state. The crosslinking liquid crystal compound contained in the coating film is homeotropically oriented, and then the coated substrate is made to roughly room temperature while the state is maintained. This makes it possible to efficiently maintain the crosslinking liquid crystal compound in a homeotropically oriented state until crosslinking reaction in a later step. Further, the coated substrate may be baked for the removal of the remaining solvent and assurance of the orientation of the crosslinking liquid crystal compound contained in the coating film. The baking method is not particularly limited, and for example, the coated substrate is place on a hot plate and can be baked at a temperature range of from 70° C. to 120° C. for about 2 min to 30 min.

The above description does not limit orientation treatment in which the crosslinking liquid crystal compound contained in the liquid crystal composition of the invention is homeotropically oriented. A generally known method for orientation treatment in which a crosslinking liquid crystal compound is homeotropically oriented, for example, a method of applying an electric field or magnetic field from a predetermined direction relative to the coating film or the like can be also selected as appropriate and used.

Next, the crosslinking liquid crystal compound homeotropically oriented in the coating film is crosslinking reacted to immobilize the orientation. This crosslinking reaction proceeds by irradiation of the coating film surface with light. At this time, the wavelength of the light radiated on the coating film is selected as appropriate depending on the absorption wavelength of the liquid crystal composition constituting the coating film. More specifically, the wavelength of the light is selected as appropriate depending on the absorption wavelength of a photopolymerization initiator contained in the liquid crystal composition. The light radiated on the coating film is not limited to monochromatic light and may be light having a certain wavelength region containing a photosensitive wavelength of the crosslinking liquid crystal compound. Specifically, an active radiation ray such as an ultraviolet ray is generally radiated. For example, when an ultraviolet ray is radiated to crosslinking cure a crosslinking liquid crystal compound, an ultraviolet ray with a wavelength of roughly from 200 to 500 nm is generally radiated onto the coating film. Available examples of the ultraviolet-ray source include a high-pressure mercury lamp, a xenon lamp, and a metal halide lamp. The irradiation dose varies depending on the kind and composition of crosslinking liquid crystal compounds, the kind and amounts of photopolymerization initiators, or the like, and is normally in the order of 10 to 3000 mJ/cm$^2$.

The crosslinking reaction of a crosslinking liquid crystal compound is preferably done while a coated substrate is heated to a temperature lower by from 1 to 10° C. than the temperature at which the liquid crystal is phase transited from a liquid crystal phase to an isotropic phase. This can reduce the turbulence of the homeotropic orientation of the crosslinking liquid crystal compound at the time of the crosslinking reaction. From this standpoint, the temperature for performing the crosslinking reaction is preferably a temperature lower by from 3 to 6° C. than the temperature at which the liquid crystal is phase transited from a liquid crystal phase to an isotropic phase.

As another method of the crosslinking reaction of acrosslinking liquid crystal compound, a method is acceptable that irradiates the coating film with light having a photosensitive wavelength of the crosslinking liquid crystal compound while the coated substrate is heated to the liquid crystal phase temperature, in an inert gas atmosphere. This method crosslinking polymerizes liquid crystal molecules in an inert gas atmosphere, and thus has the advantage of being capable of restraining the turbulence of homeotropic orientation of liquid crystal molecules positioned apart from the base material surface (i.e., liquid crystal molecules close to the coating film surface) compared to the case where crosslinking polymerization is carried out in air atmosphere.

Still another method of the crosslinking reaction of a crosslinking liquid crystal compound can involve: irradiating the coating film with light having a photosensitive wavelength of the crosslinking liquid crystal compound in an inert gas atmosphere or in air atmosphere while the coated substrate is heated to the liquid crystal temperature to partially progress the crosslinking reaction (called a partial crosslinking step); cooling the coated substrate to a temperature (Tc) at which the liquid crystal becomes a liquid crystal phase after the partial crosslinking step; further irradiating the coating film of the coated substrate with the light of the photosensitive wavelength in the state to progress the crosslinking reaction, to thereby complete the crosslinking reaction. Additionally, the temperature Tc is a temperature at which liquid crystal molecules become a liquid crystal phase in the coated substrate prior to progressing the crosslinking reaction.

In the partial crosslinking step, even if the coated substrate is cooled to the temperature Tc, the crosslinking reaction proceeds to an extent in which the homeotropic orientation of the crosslinking liquid crystal compound contained in the coating film is maintained. The extent of the progress of the crosslinking reaction in the partial crosslinking step is selected as appropriate depending on the kind of the crosslinking liquid crystal compound contained in the coating film, the film thickness of the coated and the like. The crosslinking reaction is preferably made to proceed until the degree of the crosslinking of the crosslinking liquid crystal compound is in the range of from 5 to 50.

The methods described above form a substrate having the colored layer 3 and the phase difference layer 4 produced by crosslinking polymerizing the crosslinking liquid crystal compounds in a state of their homeotropic orientation to immobilize the orientation in this order, on the transparent substrate 2. So far, as one embodiment of the invention, the color filter 1 has been described in which the transparent substrate 2, colored layer 3 and phase difference layer 4 are formed in this order. However, the constitution of the invention is not limited thereto, and for example a color filter is not excluded in which the transparent substrate, phase difference layer and colored layer are formed in this order. In the invention, even when a liquid crystal composition is directly applied onto the base material surface, it is important to well homeotropically orient the crosslinking liquid crystal compound contained in the liquid crystal composition. This makes it possible for a color filter provided with a phase difference layer formed by use of the liquid crystal composition of the invention to exhibit an excellent phase difference function, particularly when black is displayed, to provide a high quality image without light leakage.

In particular, the invention has the advantage that a phase difference layer can be formed, like the color filter 1 described above, without turbulence of the orientation of a crosslinking liquid crystal compound when a liquid crystal composition is applied to the top surface of a colored layer to form a phase difference layer, even if the surface of the colored layer is subjected to cleaning treatment and/or surface modification treatment.

The phase difference layer 4 is not particularly limited in the thickness so long as it exhibits a desired phase difference amount. In general, the thickness of the phase difference layer 4 is preferably in the order of 0.5 to 10 μm, in consideration of productivity and the like.

A substrate provided with the phase difference layer 4 formed by the method described above is desirably further supplied to a baking step. More specifically, the baking of the phase difference layer 4 in the substrate can desirably improve the heat resistance and adhesion of the phase difference layer 4.

The above baking step can be carried out by placing the substrate after completion of the crosslinking step in the phase difference layer 4 in an oven heated to a certain temperature or the like and then heating the substrate. For example, in an air atmosphere and atmospheric pressure, the above baking step can be performed by use of an "hot blast circulation oven KLO-60M" (available from AS ONE Corp.). The baking temperature and baking time can be determined as appropriate depending on the thickness of a substrate provided with the phase difference layer 4, the thickness of the phase difference layer 4 itself, the kind of crosslinking-liquid crystal compound, and the like. In general, the baking time is from 0.5 hour to 2.5 hours both inclusive, and the baking temperature is preferably from 200° C. to 250° C. both inclusive. When the baking time in the baking step exceeds 2.5 hour, the substrate is yellow changed or the like to decrease the transmittance of the substrate in some cases. On the other hand, when the baking time is less than 0.5 hour, the adhesion, heat resistance and the degree of cure of the substrate are lowered, so that a sufficient endurance cannot be obtained in some cases.

A substrate in this invention has a phase difference layer that is cured by crosslinking polymerizing in a state in which a crosslinking liquid crystal compound is homeotropically oriented, and thus can be used as a member for controlling the polarization state of light such as, for example, an optical compensation member of a member controlling a phase difference.

In particular, a liquid crystal composition of the invention contains an amino-based silane coupling agent. In the phase difference layer 4 formed by use of the liquid crystal composition, in the orientation treatment of the crosslinking liquid crystal compound, the crosslinking liquid crystal compound contained in the composition can be stably homeotropically oriented without use of a perpendicular oriented film to well achieve the perpendicular orientation of the optical axis of the phase difference layer 4. Additionally, as described above, prior to the formation of the phase difference layer 4, the surface of the colored layer 3 is subjected to cleaning treatment and/or surface modification treatment. As a result, even the change of surface properties of the colored layer 3 does not disturb the homeotropic orientation of the crosslinking liquid crystal compound in the subsequently formed phase difference layer 4. In this manner, a regular homeotropic orientation of the crosslinking liquid crystal compound is realized on the top surface of the colored layer, and then the orientation of the liquid crystal compound is immobilized, so that the phase difference layer 4 with high orientation stability can be formed.

The color filter 1 of the invention is completed by further forming the spacer 9 on the phase difference layer 4 in the above substrate.

<Spacer>

The formation of the spacer 9 involves: applying onto the phase difference layer 4 a photosensitive paint with photo-curing properties comprised of a material such as acrylic, amide or ester polymer containing multifunctional acrylate and drying; exposure-curing the paint through a mask pattern corresponding to a position to be formed of the spacer 9; etching-removing the uncured portion; and further baking the whole.

When a protective layer is formed within a color filter of the invention, the protective layer can be formed by applying, drying and curing on an arbitrary base material surface a transparent resin material comprised of a material such as an acrylic, amide or ester polymer containing multifunctional acrylate or a transparent resin paint comprised of a material such as an acrylic, amide or ester polymer containing multi-functional epoxy.

The color filter of the invention obtained above has few optical leaks and exerts a stable, excellent view angle modification effect when used in a liquid crystal display apparatus.

Although the color filter of one embodiment of the invention has been explained, the color filter of the invention is not necessarily provided with spacers. Additionally, when the color filter of the invention is used as a display side substrate in a liquid crystal display apparatus, the color filter 1 can be further provided with a transparent conductive film or the like. The color filter of the invention needs to have at least a transparent substrate, colored layer and phase difference layer, and particularly importantly has a phase difference layer in which a crosslinking liquid crystal compound is stably homeotropically oriented.

<Evaluation of Color Filters>

Whether or not the phase difference layer 4 in the color filter well homeotropically orients can be evaluated by the presence or absence of light leakage of the color filter. Specifically, the light transmission test below is carried out and the presence or absence of its transmitted light is visually observed to be evaluated.

First, a colored layer 3 is formed on a transparent substrate 2, and a phase difference layer 4 is formed on the top surface of the colored layer 3 to form a color filter 1. In a polarizing microscope, the color filter 1 is placed between two polarizing plates placed in a crossed Nicols state. That is, in a black display state, light is radiated from one face side of the substrate to transmit the light through the color filter 1. Then, the transmission of the above light is observed under a polarizing microscope to thereby confirm the presence or absence of light leakage in the color filter 1. A color filter without light leakage shows that a phase difference layer in the color filter well homeotropically orients. A color filter without light leakage is preferably used in the display side substrate of a liquid crystal display apparatus, because a high quality display excellent in contrast can be provided. On the other hand, it is understood that in a color filter with light leakage the orientation of the phase difference layer in the color filter is disturbed. In this manner, when a color filter with light leakage is used in the display side substrate of a liquid crystal display apparatus, the contrast is bad and a sufficient display quality cannot be provided in some cases.

Figure 2:
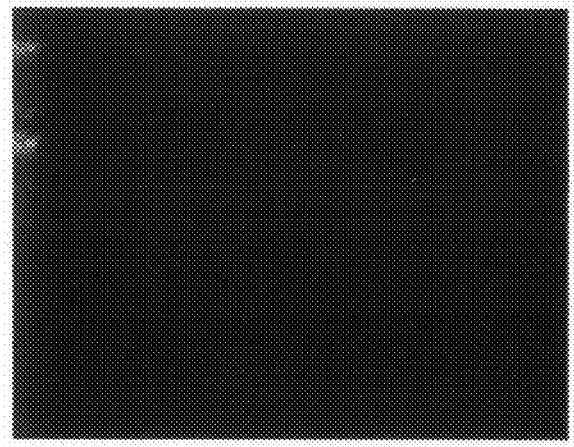
FIG. 2 is a photograph of the surface of a color filter with no light leakage when light leakage of the color filter is observed in a crossed Nicols state.
Figure 3:
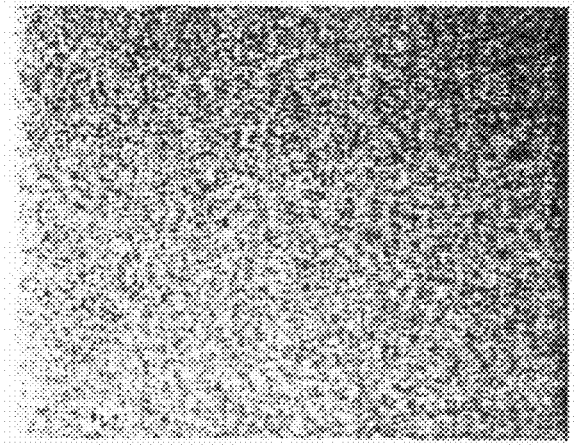
FIG. 3 is a photograph of the surface of a color filter with light leakage when light leakage of the color filter is observed in a crossed Nicols state.

In a color filter supplied to the above light transmission test, a state having no light leakage or having an extent of neglecting the light leakage refers to a black state of not visually identifying the light transmission on the entire color filter face, as shown in FIG. 2 as a reference. FIG. 2 shows a photograph when a color filter of the invention produced by forming a red-colored-pixel monochromic colored layer on a transparent substrate, ultraviolet-cleaning the surface of the colored layer and then forming a phase difference layer on the surface by use of a liquid crystal composition of the invention is subjected to the light transmission test. On the contrary, a state of having light leakage in the light transmission test refers to a state in which the entire color filter face is half-light and the transmission of light is visually identified, even if it is made to be a state of black display, as shown in FIG. 3 as a contrast example. Additionally, FIG. 3 shows a photograph taken when a color filter formed as with the color filter shown in FIG. 2 except that an amino-based silane coupling agent is not added to a liquid crystal composition is subjected to the light transmission test.

Additionally, the light leak evaluation of evaluating the extent of light leakage of a color filter can also be carried out by a method of calculating the luminance ratio of a color filter itself. The luminance ratio can be evaluated by sandwiching a color filter between polarizing plates of a polarizing microscope to measure the light luminance transmitted when light is applied thereto. Specifically, two polarizing plates are crossed (so-called black display state) and a color filter is sandwiched therebetween to measure the luminance when light is transmitted to take the luminance as Toff. On the other hand, in a state in which two polarizing plates are made parallel (so-called white display state), a color filter is sandwiched therebetween to measure the luminance when light is transmitted to take the luminance as Ton. Then, calculation of Ton/Toff allows the luminance ratio to be obtained. In the invention, a "color filter having no light leakage or having an extent of neglecting the light leakage" refers to a color filter having an obtained luminance ratio of 1000 or more.

Moreover, the presence or absence of the light leakage of the color filter can also be determined by use of a liquid display apparatus provided with a driving liquid crystal cell between a color filter of the invention as one side substrate and a substrate opposite thereto. In the liquid crystal display apparatus, a phase difference layer in the color filter functions as a so-called incell phase difference layer in the liquid crystal display apparatus. In the liquid display apparatus, the luminance ratio represented by the ratio Ton/Toff, (where Ton is the luminance in a white display state, and Toff is the luminance in a black display state), can lead to the evaluation of the light leakage of the color filter attached to the apparatus. In a color filter with no light leakage of the invention, particularly the luminance ratio is preferably 1000 or more. The phase difference layer installed in the liquid crystal display apparatus indicating a luminance ratio of 1000 or more can be said to have an incell phase difference suitably used in a liquid crystal display apparatuses of applications such as, for example, monitors of high-end model disk top personal computers and TVs. In particular, in the case where the luminance ratio is 1500 or more, a very high-quality image can be provided in a dark display screen. Accordingly, in a display apparatus provided with a color filter of a luminance ratio of 1500 or more, viewer can visually recognize an image in which shading is further vivid and clear.

The methods of evaluating a color filter from another viewpoint, i.e., methods of evaluating whether or not the phase difference layer in the color filter well homeotropically orients include the measurement of a phase difference value.

Figure 4:
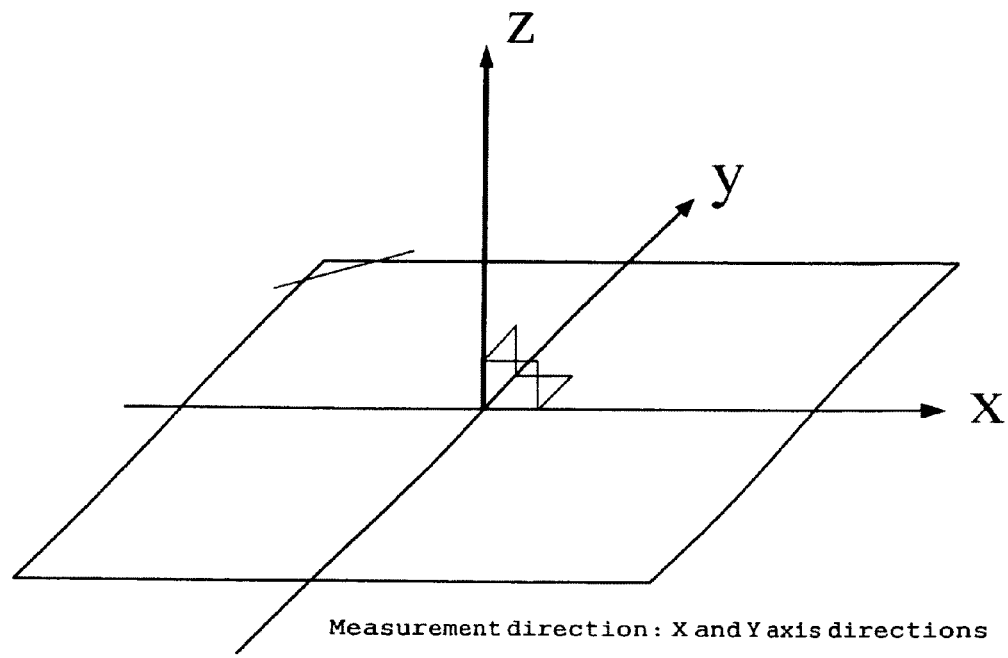
FIG. 4 is a diagram indicating the phase difference measurement direction of a sample.

Specifically, first, suppose the xyz Cartesian coordinate in which the thickness direction of the phase difference layer in a color filter as shown in FIG. 4 is taken as the z axis. Then, in a specific wavelength, a phase difference value of the phase difference layer is measured from the direction inclined to the x axis and the direction inclined to the y axis relative to the z axis. As a result, the observation of whether or not the phase difference arising from the phase difference layer exhibits symmetry relative to the z axis can lead to the evaluation of the orientation properties of the phase difference layer. Additionally, from a numerical value of a phase difference value when the measurement angle is 0°, whether or not the phase difference layer homeotropically orients can be evaluated. In a phase difference layer in the invention, particularly, the phase differences measured from the x and y axis directions are preferred to exhibit symmetry relative to the z axis. In addition, from the viewpoint of the phase difference value, the numerical value of the phase difference value when the measurement angle is 0° is 4 nm or less, preferably 3.5 nm or less, and more preferably 3 nm or less. If the phase difference value is 3 nm or less, the use of the color filter for a liquid crystal display apparatus is preferred because the deviation of the phase difference is very small, no light leakage is present in a black display state, and a clear and high quality image can be displayed. In particular, in a color filter having a phase difference layer formed without use of an oriented film, or in a color filter having a phase difference layer formed on the base material surface subjected to cleaning treatment and/or surface modification treatment, the indication of the symmetry of the above phase difference and the phase difference value is preferable.

Figure 5:
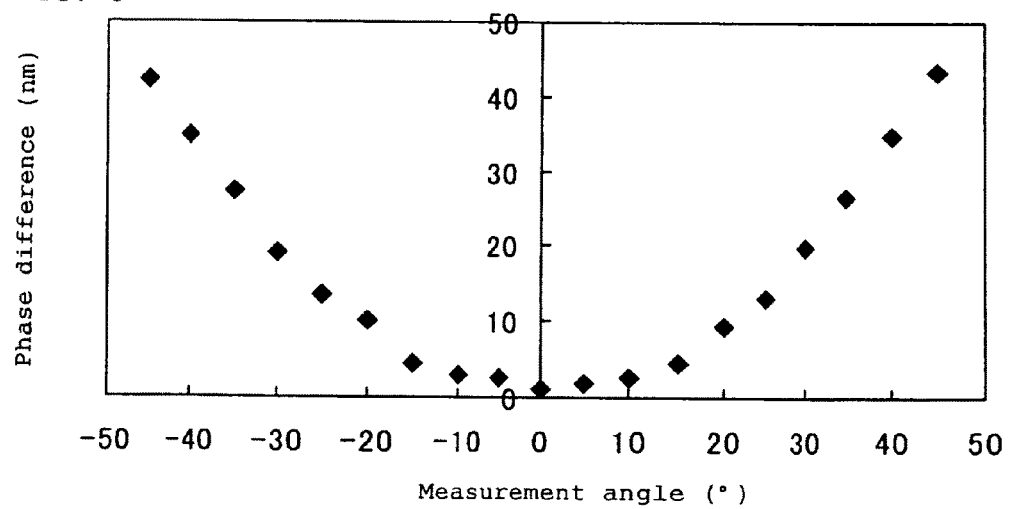
FIG. 5 is a graph indicating the relationship between a measurement angle and a phase difference of a homeotropically oriented phase difference layer.
Figure 6:
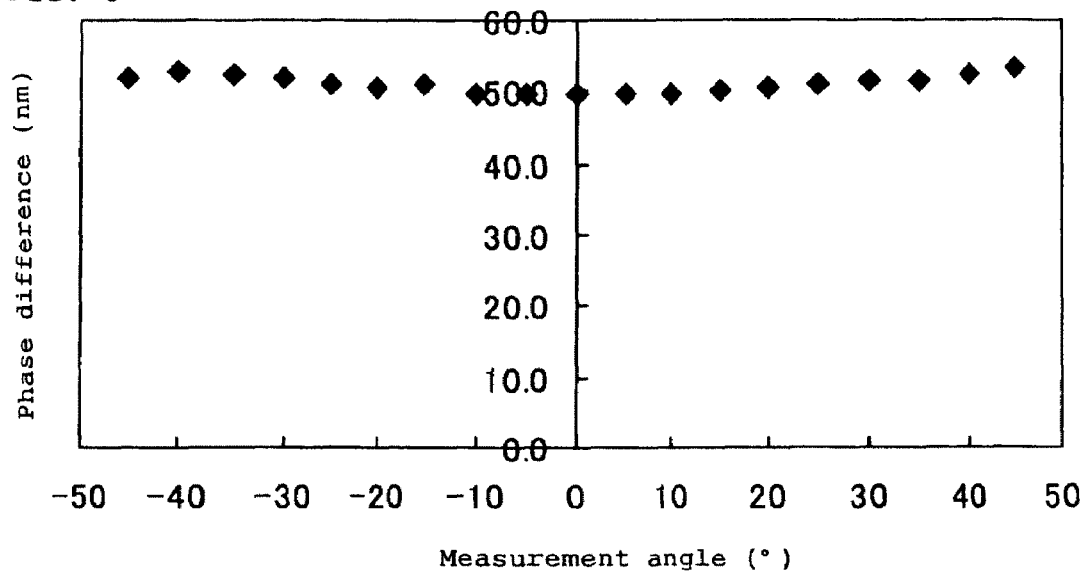
FIG. 6 is a graph indicating the relationship between the measurement angle and phase difference of a phase difference layer that is not homeotropically oriented.

A graph indicating a phase difference value of a phase difference layer in which a crosslinking liquid crystal compound well homeotropically orients is shown in FIG. 5 in association with the measurement of the phase difference value. In the phase difference layer in a color filter of the invention, as shown in FIG. 5, the phase difference measured from the x and y axis directions relative to the z axis exhibits symmetry, and the numerical value of the phase difference value when the measurement angle is 0° is 4 nm or less. On the other hand, FIG. 6 shows, as a reference, a graph indicating the phase difference value of a phase difference layer in which the orientation of a crosslinking liquid crystal compound forming a phase difference layer is disturbed and a good homeotropic orientation is not obtained. In FIG. 6, the phase difference measured from the x and y directions does not exhibit symmetry relative to the z axis and the phase difference value when the measurement angle is 0° exceeds 4 nm.

<Liquid Crystal Display Apparatus of the Present Invention>

Figure 7:
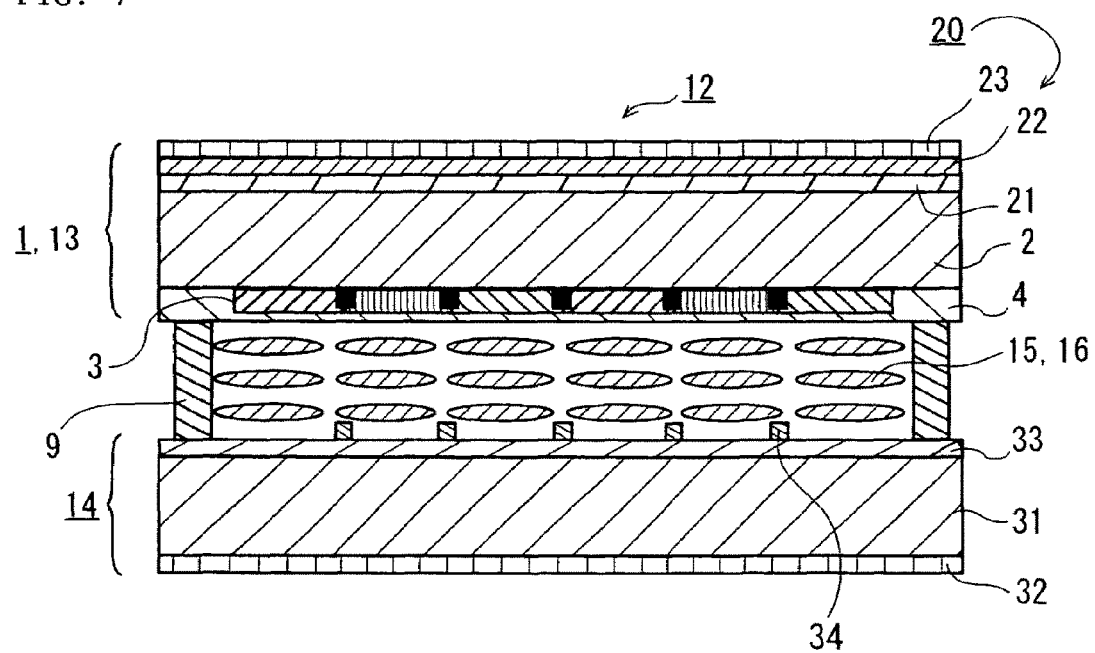
FIG. 7 is a longitudinal cross sectional view schematically showing one embodiment of a liquid crystal display apparatus using a color filter of the present invention.

The color filter 1 of the invention can be used as a display side substrate of a liquid crystal display apparatus. In a liquid crystal display apparatus 12 shown in FIG. 7, the color filter 1 of the invention is used as a display side substrate 13 placed on the observer side (corresponding to the upward direction in the figure). In the liquid crystal display apparatus 12, the display side substrate 13 faces a liquid crystal driving side substrate 14 with a spacer 9 interposed therebetween, a driving liquid crystal material 15 is enclosed in between both the substrates to construct a driving liquid crystal cell 16. Here, the phase difference layer 4 is placed so as to be sandwiched between the transparent substrate 2 in the color filter 1 and a transparent substrate 31 constituting the liquid crystal driving side substrate 14. In other words, the phase difference layer 4 is a so-called phase difference layer of an incell type. A functional layer 20 is formed on the surface of the transparency substrate 2 opposite to the colored layer 3. The functional layer 20 is formed in such a manner that a transparent conductive film 21 and a positive A plate 22 are laminated in this order. A linear polarizing plate 23 is laminated on the outer side of the display side substrate 13, and a linear polarizing plate 32 is laminated on the outer side of the liquid crystal driving side substrate 14.

In the case where the liquid crystal display apparatus 12 is in an IPS mode, the linear polarizing plate 23 of the display side substrate 13 and the linear polarizing plate 32 of the liquid crystal driving side substrate 14 are arranged such that their transparent axes are orthogonal to each other.

The liquid crystal driving side substrate 14 includes a driving circuit 33 and driving electrodes 34 the load of voltage of which is controlled thereby, on the incell side of the transparent substrate 31 (the side in which the driving liquid crystal material 15 is enclosed).

The above-described liquid crystal display apparatus 12 is only one embodiment of the invention, and such a construction does not limit a liquid crystal display apparatus of the invention. It is important that a liquid crystal display apparatus of the invention is constructed such that at least a color filter of the invention is a display side substrate and a driving liquid crystal material is enclosed between the display side substrate and the other substrate opposite thereto. According to such a construction, the liquid crystal display apparatus is advantageous because the phase difference layer formed by use of the liquid crystal composition of the invention is present between the substrates, and function as a so-called incell type.

EXAMPLES

The present invention will be described in more detail by use of examples hereinafter.

Example 1

Composition A with the composition below was prepared by use of compounds (a) to (d) indicated in chemical formulae 5 below. The composition A was prepared by mixing the materials listed below in accordance with the description of Japanese Patent Application National Publication No. 2004-524385. A weight ratio of each substance in the composition A as indicated below is a weight ratio of each substance relative to the total weight of the composition A.

having a film thickness of 2.0 μm. The haze of the color filter substrate obtained was 1.9. Subsequently, the colored layer was subjected to ultraviolet-ray cleaning at a wavelength of 254 nm and an energy of 900 mJ/cm$^2$. For the ultraviolet-ray cleaning was used OC-2506 (trade name, available from Iwasaki Electric Co., Ltd.).

After the ultraviolet-ray cleaning treatment, the liquid crystal composition solution was spin coated on the colored layer by means of a spin coater 1H-360S (trade name, available from Mikasa Co., Ltd.) to form a coating film and reduced-pressure dry. Subsequently, in an air atmosphere, the coating film was irradiated with ultraviolet rays at 20 mW/cm$^2$ for 10 sec by means of an ultraviolet-ray radiation apparatus having a super high-pressure mercury lamp (trade

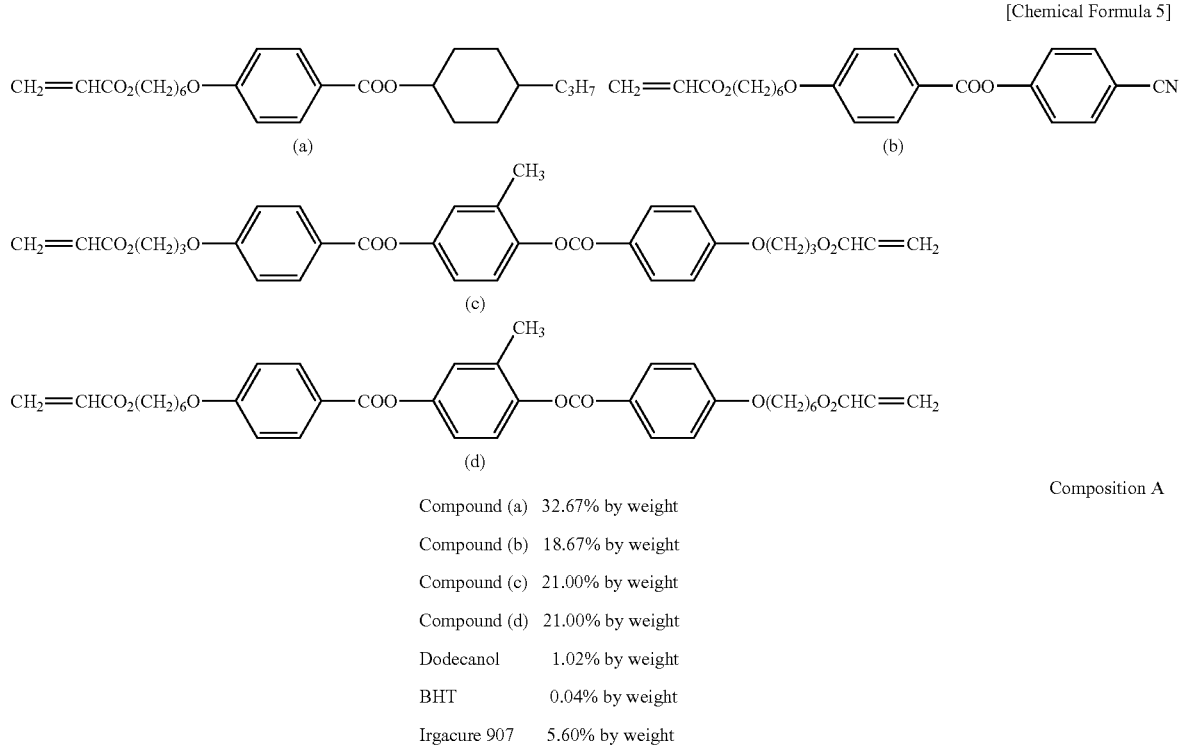

[Chemical Formula 5]

Composition A

| | |
|---|---|
| Compound (a) | 32.67% by weight |
| Compound (b) | 18.67% by weight |
| Compound (c) | 21.00% by weight |
| Compound (d) | 21.00% by weight |
| Dodecanol | 1.02% by weight |
| BHT | 0.04% by weight |
| Irgacure 907 | 5.60% by weight |

Next, 0.01% by weight (value relative to a total amount of blending components) of N-2(aminoethyl)3-aminopropyltrimethoxysilane (KBM-603 available from Shin-Etsu Chemical Co., Ltd.) as a silane coupling agent was added to the composition A to obtain a liquid crystal composition of the present invention.

Next, the liquid crystal composition was dissolved with propylene glycol monoethyl ether acetate (PGMEA) to obtain a liquid crystal composition solution having a concentration of 20%.

Next, the surface of a glass plate having a square of 100× 100 mm and a thickness of 0.7 mm (1737 Glass available from Corning Corp.) was subjected to cleaning treatment to prepare a clean transparent substrate. Then, a red colored resist described below was applied onto the transparent substrate by a spin coat method, and the coating film was prebaked at 90° C. for 3 minutes and subjected to alignment light exposure (100 mJ/cm$^2$), followed by being post baked at 230° C. for 30 minutes to form a red monochromatic colored layer name: TOSCURE 751, available from Harison Toshiba Lighting Corp.) to crosslink crosslinking liquid crystal compounds contained in the coating film and form a phase difference layer. Finally, the substrate after completion of the crosslinking treatment was placed within an oven at 230° C. and baked for 30 min to form a color filter of the present invention having a phase difference layer with a film thickness of 1.0 μm for Example 1.

Photoresist Composition for Red Coloring Pixel

| | |
|---|---|
| Red pigment<br>(C. I. PR254 (Chromophtal DPP Red BP,<br>available from Ciba Specialty<br>Chemicals Co., Ltd.)) | 5.0 weight parts |
| Yellow pigment<br>(C. I. PY139 (Paliotol Yellow D1819,<br>available from BASF Corp.)) | 1.0 weight part |

-continued

| | |
|---|---|
| Dispersant (Solsperse 24000, available from Zeneca) | 3.0 weight parts |
| Multifunctional acrylate monomer (SR399, available from Sartomer Company, Inc.) | 4.0 weight parts |
| Polymer (VR60, available from Showa Highpolymer Co., Ltd.) | 5.0 weight parts |
| Initiator 1 (Irgacure 907, available from Nihon Chiba-Geigy K.K.) | 1.4 weight parts |
| Initiator 2 (2,2'-bis(o-chlorophenyl)-4,5,4',5'-tetraphenyl-1,2'-biimidazol) | 0.6 weight part |
| Solvent Propylene glycol monomethyl ether acetate | 80.0 weight parts |

(Evaluation 1)

Evaluation of Orientation Properties

Example 1 was irradiated with light having a wavelength of 589 nm, a phase difference generated when the light was transmitted through the phase difference layer in Example 1 was measured in accordance with the above method of measuring a phase difference value to evaluate an orientation state of a crosslinking liquid crystal compound constituting the phase difference layer. In other words, as shown in FIG. 4, it was assumed that the x and y axes are mutually orthogonal on the surface of a phase difference layer of an optical element (color filter in the example) and the z axis is perpendicular to the x and y axes. Then, the phase difference of the phase difference layer was measured in the direction inclined to the x and y axis directions relative to the z axis direction and the z axis. Additionally, when measurement was carried out in the direction in which the phase difference was inclined to the x axis, and in the case where measurement was carried out in the direction inclined to the y axis direction, it was determined whether or not the phase difference generated in the optical element exhibited symmetry relative to the z axis. On the basis of the measurement results, evaluated was the quality of the orientation properties, i.e., whether or not the crosslinking liquid crystal compound in the phase difference layer well homeotropically oriented as follows. RETS-1250 AV available from Otsuka Electronics Co. Ltd. was used for the measurement of the phase difference.

The phase difference exhibits symmetry both in the x and y axis directions and the phase difference value in the z direction is 4 nm or less: ◎ (Very good)

The phase difference exhibits symmetry in the x and y axis directions, or the phase difference value in the z direction is 4 nm or less: ○ (Good)

The phase difference exhibits turbulence in symmetry in the x and y axis directions, and the phase difference value in the z direction is larger than 4 nm: X (Bad)

The result of evaluation 1 of Example 1 was "Very good", so that is was confirmed that the crosslinking liquid crystal compound forming the phase difference layer in Example 1 was indicated to well homeotropically orient.

(Evaluation 2)

Visual Observation on Presence or Absence of Light leakage and Light Leakage Evaluation The polarizing microscope CPX31-P available from Olympus Corp. was set in a crossed Nicols state and light was applied to the substrate surface from the normal direction relative to the substrate surface in a state in which the color filter of Example 1 was sandwiched between the polarizing plates. Then, the presence or absence of light leakage in Example 1 was visually observed. Additionally, the luminance at this time was measured.

Next, the polarizing plates were set in a parallel state, the color filter of Example 1 was sandwiched between the polarizing plates, and in the state, light was applied thereto from the normal direction relative to the substrate surface to measure the luminance. When the luminance in a crossed Nicols state (i.e., black display) was set to be Toff and the luminance in a parallel state (i.e., white display) was set to be Ton, and the luminance ratio Ton/Toff was calculated. Then, the light leakage of the color filter was evaluated as follows. The luminance was measured by means of an EZ Contrast 160 (available from ELDIM Corp.)

The presence or absence of light leakage is not observed visually and the Ton/Toff ratio is 1100 or more: ◎ (Very good)

The presence or absence of light leakage is not observed visually and the Ton/Toff ratio is from 1000 or more and less than 1100: ○ (Good)

Light leakage is clearly present and the Ton/Toff ratio is less than 1000: X (Bad)

The result of evaluation 2 of Example 1 was "Vary good", so that it was confirmed that the color filter of Example 1 exhibited no light leakage.

(Evaluation 3)

Adhesion Test

The color filter of Example 1 was subjected to acceleration life testing at a temperature of 100° C. and a humidity of 100% for one hour. Thereafter, the adhesion of the phase difference layer in the color filter to the substrate (i.e., colored layer) was tested in accordance with JIS K5600-5-6. More specifically, the above acceleration life test was carried out at 100° C. and 100% RH for one hour by means of an acceleration life testing machine EHS-411M available from Espec Corp. Then, Example 1 was placed at a temperature of 23±2° C. and a humidity of about 50±5%, and cut 6 times into a lattice shape with 1 mm intervals in the longitudinal and transversal directions to have a lattice of squares of 5' 5 numbers. Next, a tape having an adhesion of 10±1 N for widths of 25 mm' 25 mm with a length of about 75 mm was adhered onto the lattice so that the longitudinal direction of the tape was parallel to any side of the lattice, and pressure stuck with a finger. Then, an end of the tape was pinched up and peeled over 0.5 to one second at about a 60-degree angle formed between the non-adhesive face of the tape and the substrate surface, and then the lattice state thereafter was evaluated on the basis of 6 levels below. For a phase difference layer having an evaluation criterion of 1 or less, it can be evaluated that the adhesion properties with the substrate is high and when the phase difference layer is used for a liquid crystal display apparatus or the like, sufficient adherence reliability is obtained over a long period of time. Thus, the testing result was evaluated in accordance with the evaluation criteria below with "○(Good)", "Δ(Fair)", and "X (Bad)".

Evaluation Criterion 0: The edge of a cut is completely smooth and the squares of any lattices have no peeling pieces.

Evaluation Criterion 1: Small peeling pieces in the coating film in the cross cut part are observed; however, the part affected in the cross cut part is 5% or less.

Evaluation Criterion 2: Along the edge of the cut and/or in the cross cut part, peeling pieces are observed. Part affected in the cross cut part clearly exceeds 5%, but is less than 15%.

Evaluation Criterion 3: Partially or totally extreme peeling is observed along the edge of the cut, and/or several sites of the lattice squares partially or totally peeling are generated. The cross cut part affected clearly exceeds 15%, but is less than 35%.

Evaluation Criterion 4: Partially or totally extreme peeling is observed along the edge of the cut, and/or several squares of the lattice are partially or totally peeled. The cross cut part affected clearly exceeds 35%, but is less than 65%.

Evaluation Criterion 5: Any extent of peeling that cannot be classified into Evaluation Criterion 4 (including a state in which the total face of the squares of the lattices is peeled).

Evaluation Criterion 0 or 1: "○ (Good)"
Evaluation Criterion 2 or 3: "Δ (Fair)"
Evaluation Criterion 4 or 5: "X (Bad)"

The result of evaluation 3 of Example 1 was "○ (Good)". Thus, it was confirmed that the phase difference layer in Example 1 was well adhered to the colored layer.

(Evaluation 4)

Haze Measurement Test

The transparency of the phase difference layer in Example 1 was evaluated by the method below. In other words, the evaluation of the transparency of the phase difference layer formed in Example 1 was carried out by the measurement of the haze of Example 1 in the thickness direction. The haze of a color filter was measured in accordance with JIS K 7136. Additionally, upon the measurement of the haze of Example 1, an "NDH-2000" available from Nippon Denshoku Industries Co., Ltd. was used as a measuring machine. As a result, the haze of Example 1 was 2.7%.

The results of evaluations 1 to 4 in Example 1 are summarized in Table 1.

Example 2

In Example 2, a color filter was prepared in the same manner as in Example 1, except that the coupling agent to be added was changed for 3-aminopropyltrimethoxysilane (KBM-903, available from Shin-Etsu Chemical Co., Ltd.). Example 2 was evaluated in accordance with evaluations 1 to 4 above. The evaluation results are indicated in Table 1.

Example 3

In Example 3, a color filter was prepared in the same manner as in Example 1, except that the coupling agent to be added was changed for 3-triethoxysilyl-N-(1,3-dimethyl-buthylidene)propylamine (KBE-9103 available from Shin-Etsu Chemical Co., Ltd.). Example 3 was evaluated in accordance with evaluations 1 to 4 above. The evaluation results are indicated in Table 1.

Example 4

In Example 4, a color filter was prepared in the same manner as in Example 1, except that the amount of the coupling agent to be added was changed for 20% by weight. Example 4 was evaluated in accordance with evaluations 1 to 4 above. The evaluation results are shown in Table 1.

Example 5

In Example 5, a color filter was prepared in the same manner as in Example 2, except that the amount of the coupling agent to be added was changed for 20% by weight. Example 5 was evaluated in accordance with evaluations 1 to 4 above. The evaluation results are shown in Table 1.

Example 6

In Example 6, a color filter was prepared in the same manner as in Example 3, except that the amount of the coupling agent to be added was changed for 20% by weight. Example 6 was evaluated in accordance with evaluations 1 to 4 above. The evaluation results are shown in Table 1.

Comparative Example 1

In Comparative Example 1, a color filter was prepared in the same manner as in Example 1, except that the silane coupling agent was not used. Comparative Example 1 obtained was evaluated in accordance with evaluations 1 to 4 above. The evaluation results are shown in Table 1.

Comparative Example 2

In Comparative Example 2, a color filter was prepared in the same manner as in Example 1, except that vinylethoxysilane (KBE-1003 available from Shin-Etsu Chemical Co., Ltd.) was used as a silane coupling agent.

Comparative Example 2 was evaluated in accordance with evaluations 1 to 4 above. The evaluation results are shown in Table 1.

Comparative Example 3

In Comparative Example 3, a color filter was prepared in the same manner as in Example 1, except that 3-glycidoxypropyltrimethoxysilane (KBM-403 available from Shin-Etsu Chemical Co., Ltd.) was used as a silane coupling agent. Comparative Example 3 was evaluated in accordance with evaluations 1 to 4 above. The evaluation results are shown in Table 1.

TABLE 1

| | Silane coupling agent | Amount of addition of silane agent (weight %) | Evaluation 1 Orientation properties | Evaluation 2 Light leakage | Evaluation 2 Luminance ratio | Evaluation 3 Substrate adhesion | Evaluation 4 Haze (%) |
|---|---|---|---|---|---|---|---|
| Example 1 | KBM-603 | 0.01 | Good | Absent | 1300 | 1 | 2.7 |
| Example 2 | KBM-903 | 0.01 | Good | Absent | 1300 | 1 | 3.4 |
| Example 3 | KBE-9103 | 0.01 | Good | Absent | 1700 | 1 | 1.95 |
| Example 4 | KBM-603 | 20.0 | Good | Absent | — | 1 | 3.7 |
| Example 5 | KBM-903 | 20.0 | Good | Absent | — | 1 | 3.9 |
| Example 6 | KBE-9103 | 20.0 | Good | Absent | — | 1 | 1.98 |
| Comparative Example 1 | none | — | Not good | Present | 500 | 5 | 3.7 |

TABLE 1-continued

|  | Silane coupling agent | Amount of addition of silane agent (weight %) | Evaluation 1 Orientation properties | Evaluation 2 Light leakage | Evaluation 2 Luminance ratio | Evaluation 3 Substrate adhesion | Evaluation 4 Haze (%) |
|---|---|---|---|---|---|---|---|
| Comparative Example 2 | KBM-1003 | 0.01 | Not good | Present | 500 | 5 | 5.2 |
| Comparative Example 3 | KBM-403 | 0.01 | Not good | Present | 500 | 5 | 5.7 |

As shown in Table 1, any of Examples 1 to 6 was good in orientation properties and had no light leakage. Thus, in Examples, the expected purpose of the present invention was confirmed to be attained. In addition, any of the phase difference layers in Examples 1 to 6 had a good adhesion to the substrate surface. This showed that the present invention had not only orientation properties, but also the further excellent effect of good adhesion to the substrate surface.

On the other hand, any of Comparative Examples 1 to 3 was not good in orientation properties. This has supported that the homeotropic orientation properties in the phase difference layer contribute to the presence of an amino-based silane coupling agent.

In the study for attaining the present invention, it has been surprisingly found that a color filter provided with a phase difference layer formed by use of a liquid crystal composition containing a ketimine-based silane coupling agent (i.e., Examples 3 and 6) exhibits a very low haze.

A haze is generally understood to be an index indicating the transparency of a phase difference layer in a color filter. Although only haze is not an index for determining the performance of a color filter, a high quality image can be provided in a display apparatus using a color filter exhibiting a low haze.

The tendency of hazes indicated in the above examples and comparative examples are as follows. In other words, the hazes of Comparative Examples 2 and 3 were clearly high as compared with the haze of Comparative Example 1. This seems to be that in Comparative Examples 2 and 3 inclusion of a new additive of a silane coupling agent in a liquid crystal composition used for the formation of a phase difference layer is one factor. On the contrary, although silane coupling agents are present in Examples 1 and 2, the examples exhibited hazes equivalent to that of Comparative Example 1. The present inventors estimate that Examples 1 and 2 had good effects on hazes because of the improvement of the orientation properties of the phase difference layer.

Furthermore, Example 3 exhibited an extremely low haze even as compared with Examples 1 and 2. The tendency of haze in Examples 1 to 3 was similarly recognized also in Examples 4 to 6 in which the amount a silane coupling agent added was 2000 times. The mechanism of a decrease in haze, which is believed to be attributed to the presence of a ketimine-based silane coupling agent, is still not clear. However, the present inventors have recognized that when a silane coupling agent is added to a crosslinking liquid crystal composition, the compatibility is generally bad; however, when a ketimine-based silane coupling agent is added, the compatibility is shown to be very good. The effect of a decrease in haze thought to be attributable to the presence of the above-described ketimine-based silane coupling agent is estimated to largely associate with the good compatibility.

As described above, the present invention attains an expected purpose. Particularly, from the viewpoints of being capable of improving the homeotropic orientation properties of a phase difference layer and restricting the haze of a color filter to a low value, it is desirable that the present invention using a ketimine-based silane coupling agent can particularly well achieve an expected purpose thereof.

INDUSTRIAL APPLICABILITY

A crosslinking liquid crystal composition of the invention can form a phase difference layer indicating a well homeotropic orientation on the base material surface without the presence of an oriented film. Thus, for example, in a display apparatus such as a liquid crystal display apparatus, the thickness of a liquid crystal cell is made thinner and at the same time a high quality image display can be provided.

The invention claimed is:

1. A liquid crystal composition, comprising:
at least one crosslinking liquid crystal compound and a ketimine-based silane coupling agent.

2. The liquid crystal composition according to claim 1, wherein
at least one of the at least one crosslinking liquid crystal compound has at least one (meth)acryloyl groups in one molecule of the crosslinking liquid crystal compound.

3. The liquid crystal composition according to claim 1, further containing a photopolymerization initiator.

4. The liquid crystal composition according to claim 1, further containing a perpendicular orientation assistant.

5. The liquid crystal composition according to claim 1, wherein
the liquid crystal composition contains 0.01 to 20% by weight (value relative to a total amount of blending components) of the ketimine-based silane coupling agent.

6. The liquid crystal composition according to claim 1, wherein
the liquid crystal composition contains 99.89 to 70% by weight (value relative to a total amount of blending components) of the at least one crosslinking liquid crystal compound has at least one (meth)acryloyl group in one molecule of the at least one crosslinking liquid crystal compound, 0.01 to 20% by weight (value relative to a total amount of blending components) of the ketimine-based silane coupling agent, and 0.1 to 10% by weight (value relative to a total amount of blending components) of a photopolymerization initiator.

7. The liquid crystal composition according to claim 1, wherein
the liquid crystal composition is used for the formation of a phase difference layer that homeotropically orients.

8. A color filter comprising:
at least a colored layer, and
a phase difference layer directly or indirectly formed on a transparent substrate,
wherein the phase difference layer is formed by mutual crosslinking polymerization of the crosslinking liquid crystal compound of the liquid crystal composition of claim 1, in a state which the at least one crosslinking liquid crystal compound contained in the liquid crystal composition is oriented in a direction perpendicular to a surface of the transparent substrates, and
wherein the ketimine-based silane coupling agent contained in the phase difference layer increases transparence of the phase difference layer.

9. The color filter according to claim 8, wherein
the crosslinking polymerization is developed by irradiating with light a surface of a coating film formed by direct application of the liquid crystal composition onto the colored layer.

10. The color filter according to claim 8, wherein
an entire face or part of a surface of the colored layer directly or indirectly formed on the transparent substrate is subjected to cleaning treatment and/or surface modification treatment, and the phase difference layer is directly formed on the surface of the colored layer subjected to the cleaning treatment and/or a surface modification treatment.

11. The color filter according to claim 8, wherein
during a test of measuring the luminance of light passing through the color filter, if the color filter is sandwiched between two linear polarizing plates, placed under a polarizing microscope and irradiated with visible light from one face of the linear polarizing plates, a value of Ton/Toff is 1000 or more, where Toff is the luminance measured in a state in which transparent axis directions of the two linear polarizing plates are mutually crossed and Ton is the luminance measured in a state in which the transparent axis directions are mutually parallel.

12. The color filter according to claim 8, wherein
at an arbitrary point on the surface of the phase difference layer, a phase difference value of a visible light ray transmitting in a direction perpendicular to the substrate is 4 nm or less.

13. The color filter according to claim 8, wherein
a plurality of spacers, each comprised of a cured substance of an ionizing radiation-curable resin composition, are directly or indirectly formed on the phase difference layer so as to be placed at arbitrary intervals on the phase difference layer.

14. A liquid crystal display apparatus, comprising:
the color filter of claim 8; and
a liquid crystal driving substrate provided with a driving circuit and at least liquid crystal driving electrodes on a transparent substrate, wherein
the color filter and the liquid crystal driving substrate face each other with the phase difference layer of the color filter and the liquid crystal driving electrodes are mounted on the driving circuit of the liquid crystal driving substrate, and
a driving liquid crystal material enclosed between the color filter and the liquid crystal driving substrate.

15. A method of forming a perpendicularly orienting phase difference layer by use of a crosslinking liquid crystal composition containing at least one crosslinking liquid crystal compound, the method including:
adding a ketimine-based silane coupling agent to the crosslinking liquid crystal composition to increase transparence of the perpendicularly orienting phase difference layer;
applying the crosslinking liquid crystal composition having the ketimine-based silane coupling agent added thereto directly to the top surface of a base material to form a coating film, and
crosslinking polymerizing a crosslinking liquid crystal compound present in the coating film in a state of perpendicularly orienting the crosslinking liquid crystal compound to be cured the coating film.

16. The method of forming a phase difference layer according to claim 15, wherein
the base material is produced by directly or indirectly forming a colored layer on a transparent substrate, and the crosslinking liquid crystal composition having the ketimine-based silane coupling agent added thereto is directly applied to a top surface of the colored layer.

17. The method of forming a phase difference layer according to claim 16, wherein
an entire face or a part of the colored layer surface is subjected to cleaning treatment and/or surface modification treatment in advance of the applying.

18. The method of forming a phase difference layer according to claim 15, wherein
irradiation of the coating film surface with light crosslinking polymerizes the crosslinking liquid crystal compound.

19. The liquid crystal composition according to claim 1, wherein the ketimine-based silane coupling agent is selected from the group consisting of 3-triethoxysilyl-N-(1,3-dimethyl-butylidene)propylamine, 3-trimethoxysilyl-N-(diethyl-methylidene)propylamine, 3-trimethoxysilyl-N-(1-ethyl-propylidene)propylamine, 3-trimethoxysilyl-N-(1-ethyl-pentylidene)propylamine, 3-trimethoxysilyl-N-(1-methyl-butylidene)propylamine, 3-trimethoxysilyl-N-(1,3-dimethyl-butylidene)propylamine, 3-trimethoxysilyl-N-(2,2'-dimethyl-pentylidene)propylamine, 3-trimethoxysilyl-N-(1,2-methyl-propylidene)propylamine, 3-trimethoxysilyl-N-(dipropyl-methylidene)propylamine, 3-trimethoxysilyl-N-(cyclopentylidene)propylamine, 3-trimethoxysilyl-N-(cyclohexylidene)propylamine, 3-trimethoxysilyl-N-(2-methylcyclohexylidene)propylamine, 3-trimethoxysilyl-N-(4-methylcyclohexylidene)propylamifle, 3-trimethoxysilyl-N-(benzylidene)propylamifle, 3-trimethoxysilyl-N-(hexylidene)propylamine, 3-trimethoxysilyl-N-(heptylidene)propylamine, 6-trimethoxysilyl-N-(1,3-dimethyl-butylidene)hexylamine, 10-trimethoxysilyl-N-(1,3-methyl-butylidene)decylamine, 10-trimethoxysilyl-N-(1,3dimethyl-butylidene)decylamine, trimethoxysilyl-N-(1,3-methyl-butylidene)methylamine, (trimethoxysilyl)ethyl-N-(1,3-methyl-butylidene)benzylamine, 3-triethoxysilyl-N-(1-methyl-propylidene)propylamine, 3-triethoxysilyl-N-(1-methyl-butylidene)propylamine, 3-triethoxysilyl-N-(1,3-dimethyl-butylidene)propylamine, 3-triethoxysilyl-N-(1-dimethyl-pentylidene)propylamine, and 3-methyldimethoxysilyl-N-(1,3-dimethyl-butylidene)propylamine.

20. The color filter according to claim 8, wherein the ketimine-based silane coupling agent contained in the phase difference layer decreases haze in the color filter.

* * * * *